US012706972B2

(12) United States Patent
Lin et al.

(10) Patent No.: US 12,706,972 B2
(45) Date of Patent: Aug. 11, 2026

(54) REMOTE MEMORY FUNCTION CALL METHOD AND NETWORK INTERFACE CARD

(71) Applicant: Huawei Technologies Co., Ltd., Shenzhen (CN)

(72) Inventors: Weibin Lin, Hangzhou (CN); Wenkai Ling, Hangzhou (CN); Shengyu Shen, Hangzhou (CN); Shanggang Xie, Hangzhou (CN); Qiuping Pan, Shenzhen (CN); Xiaoyu Chen, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 68 days.

(21) Appl. No.: 18/677,139

(22) Filed: May 29, 2024

(65) Prior Publication Data

US 2024/0348686 A1 Oct. 17, 2024

Related U.S. Application Data

(63) Continuation of application No. PCT/CN2022/101669, filed on Jun. 27, 2022.

(30) Foreign Application Priority Data

Nov. 30, 2021 (CN) ........................ 202111445721.X

(51) Int. Cl.

*G06F 15/16* (2006.01)
*H04L 49/90* (2022.01)
*H04L 67/1097* (2022.01)

(52) U.S. Cl.

CPC .......... *H04L 67/1097* (2013.01); *H04L 49/90* (2013.01)

(58) Field of Classification Search

CPC ... H04L 67/1097; H04L 49/90; G06F 3/0656; G06F 15/17331

See application file for complete search history.

(56) References Cited

U.S. PATENT DOCUMENTS 8,144,586 B2 * 3/2012 McNaughton .......... H04L 12/66 370/252
9,448,901 B1 9/2016 Aslam et al.

(Continued)

FOREIGN PATENT DOCUMENTS

CN 104011696 A 8/2014
CN 104580011 A 4/2015

(Continued)

*Primary Examiner* — Razu A Miah
(74) *Attorney, Agent, or Firm* — Conley Rose, P.C.

(57) ABSTRACT

A remote data access method is applied to a first device that is coupled to and communicates with a second device. The first device and the second device each are configured with a network interface card (NIC) having a remote direct memory access (RDMA) function. The method is performed by a NIC of the first device, and the method includes: generating a first packet including a type identifier and a function identifier; and sending the first packet to the second device. The type identifier in the first packet indicates that the first packet is a remote memory function call (RMFC)-type packet, and the RMFC-type packet indicates the second device to perform a preset operation on local data of the second device. The function identifier in the first packet indicates an operation type of the preset operation.

20 Claims, 5 Drawing Sheets

(56) References Cited

U.S. PATENT DOCUMENTS 10,257,273 B2 * 4/2019 Govind ............. G06F 15/17331
12,141,093 B1 * 11/2024 Zur ................... G06F 15/17331
12,265,497 B2 * 4/2025 Marcovitch ............. G06F 3/061
2002/0071450 A1 * 6/2002 Gasbarro ............ H04L 67/1097 370/466
2006/0159112 A1 * 7/2006 Sundaram ............. H04J 3/0682 370/516
2013/0198312 A1 * 8/2013 Tamir .................. H04L 67/1097 709/212
2014/0164545 A1 6/2014 Davis et al.
2015/0039793 A1 * 2/2015 Rossetti .................. H04L 49/90 710/105
2015/0186331 A1 * 7/2015 Gao ........................ H04L 51/04 709/212
2015/0331607 A1 * 11/2015 McCarthy ............. G06F 3/0659 711/103
2016/0266925 A1 9/2016 Wei
2017/0171075 A1 * 6/2017 Sajeepa ................. H04L 69/324
2017/0279889 A1 * 9/2017 Boss ....................... G06F 3/067
2018/0027074 A1 * 1/2018 Collet ..................... H04L 67/10 709/212
2020/0042475 A1 2/2020 Venkataramani et al.
2020/0127993 A1 4/2020 Mossler et al.
2020/0145725 A1 * 5/2020 Eberle ................ H04N 21/2387
2021/0014231 A1 * 1/2021 Durbin ................ H04W 12/088
2022/0263767 A1 * 8/2022 Zhang ................. H04L 67/5651
2023/0132302 A1 * 4/2023 Hu ...................... H04L 12/4633 709/212

FOREIGN PATENT DOCUMENTS

CN 108268208 A 7/2018
CN 112291293 A 1/2021

* cited by examiner

REMOTE MEMORY FUNCTION CALL METHOD AND NETWORK INTERFACE CARD

CROSS-REFERENCE TO RELATED APPLICATIONS

This is a continuation of International Patent Application No. PCT/CN2022/101669 filed on Jun. 27, 2022, which claims priority to Chinese Patent Application No. 202111445721.X filed on Nov. 30, 2021. The disclosures of the aforementioned applications are hereby incorporated by reference in their entireties.

TECHNICAL FIELD

This disclosure relates to the field of communication technologies, and in particular, to a remote data access method and apparatus.

BACKGROUND

Remote direct memory access (RDMA) is a transport layer network protocol used to resolve a data processing delay in network transmission. The RDMA protocol can reduce, in a data transmission process, a data replication operation inside a host device used to transmit data, and does not require intervention of an operating system of the host device used to transmit data. Therefore, the RDMA protocol can reduce load of a central processing unit (CPU) of the host device used to transmit data.

However, the current RDMA protocol provides only a function of directly storing (writing) and fetching (reading) memory data of a remote device by a local device. For example, when a client device (or a local device) in a data center queries data from a server (or a remote device) in the data center by using a read request in the RDMA protocol, the client device can only use one or more read requests to read a database in the server locally, and then traverses the read database to query the required data. It can be learned that efficiency of operating data of the remote device by the local device based on the existing RDMA protocol is low.

SUMMARY

This disclosure provides a remote data access method and apparatus. The method can improve efficiency of operating data of a remote device by a local device.

To achieve the foregoing objective, this disclosure provides the following technical solutions.

According to a first aspect, this disclosure provides a remote data access method. The method is applied to a first device that is connected to and communicates with a second device. The first device and the second device each are configured with a network interface card (NIC) having an RDMA function. The method is performed by a NIC of the first device, and the method includes generating a first packet including a type identifier and a function identifier, and sending the first packet to the second device. The type identifier in the first packet indicates that the first packet is a remote memory function call (RMFC)-type packet, and the RMFC-type packet indicates the second device that receives the first packet to perform a preset operation on local data of the second device. The function identifier in the first packet indicates an operation type of the preset operation.

According to the method provided in this disclosure, the first device (for example, a local device) may send the RMFC-type packet to the second device (for example, a remote device), to control the second device to perform the preset operation on the local data of the second device. The RMFC-type packet is a protocol packet after an RDMA protocol is extended in this disclosure. In this way, through implementation of the method provided in this disclosure by the first device, an objective of operating the local data of the second device by the first device can be implemented. For example, the first device performs the method provided in this disclosure, to implement an objective of querying the local data of the second device by the first device. Compared with an implementation in which a plurality of times of packet exchange are required when the first device performs a read operation in the RDMA protocol before extension to query memory data of the second device, in the method provided in this disclosure, only two times of packet exchange between the first device and the second device (to be specific, the first device sends the first packet to the second device, and the second device sends, to the first device, a packet used to carry target data) are required, so that the first device can query the memory data of the second device. In other words, the method provided in this disclosure improves efficiency of querying the local data of the second device by the first device. In other words, the method in this disclosure can improve efficiency of operating the local data of the second device by the first device.

In a possible design manner, the operation type of the preset operation includes any one of a query operation, an insert operation, or a delete operation.

In this possible design manner, the first device may efficiently implement an operation on the local data of the second device, for example, implement the query operation, the insert operation, or the delete operation.

In another possible design manner, if the operation type of the preset operation is the query operation, the method further includes receiving a second packet used to carry target data, and writing the target data carried in the second packet into a receive buffer. The target data is data obtained after the second device performs the query operation on the local data of the second device. The receive buffer is a buffer indicated by a head receive queue element (RQE) of a receive queue (RQ) corresponding to an application process running in the first device.

In another possible design manner, the first device is provided with an extended RQ including at least one extended RQE, and any extended RQE in the at least one extended RQE includes an address of an extended buffer corresponding to the any extended RQE. Writing the target data carried in the second packet into a receive buffer includes determining that a length of the target data carried in the second packet is greater than a length of the receive buffer, and invoking one or more extended RQEs, and writing the target data into the receive buffer and an extended buffer corresponding to the one or more extended RQEs.

In this possible design, when an amount of data carried in a send packet received by the first device is large, and therefore the length of the receive buffer indicated by the head RQE of the RQ in a queue pair (QP) is insufficient for storing the data carried in the send packet, the first device can also invoke the extended RQE in the extended RQ to successfully receive the data carried in the send packet.

In another possible design manner, the method further includes writing a completion queue element (CQE) in a completion queue (CQ). When the NIC of the first device invokes the one or more extended RQEs, the CQE indicates that the target data carried in the second packet has been written into the receive buffer and the extended buffer corresponding to the one or more extended RQEs, and indicates addresses of the receive buffer and the extended buffer corresponding to the one or more extended RQEs.

In this possible design, when invoking the extended buffer to write the received data, the NIC of the first device can also report, to a processor of the first device in a timely manner, that the current data has been written.

In another possible design manner, the function identifier in the first packet is determined based on a data request sent by the application process running in the first device.

In this possible design, the first device may obtain an operation type of an operation that is requested by the current application process to perform on the local data of the second device.

In another possible design manner, generating a first packet including a type identifier and a function identifier includes generating the first packet including the type identifier and the function identifier based on a head send queue element (SQE) of a send queue (SQ) corresponding to the application process running in the first device. The head SQE includes an address of a send buffer corresponding to the head SQE, and the send buffer is used to store a parameter of the data request sent by the application process.

According to a second aspect, this disclosure provides a remote data access method. The method is applied to a second device that is connected to and communicates with a first device, and the second device and the first device each are configured with a NIC having an RDMA function. The method is performed by a NIC of the second device, and the method includes receiving a first packet from the first device, where the first packet includes a type identifier and a function identifier, and when determining that the type identifier in the first packet is an identifier indicating that the first packet is an RMFC-type packet, notifying a processing unit of the second device to perform a preset operation on local data of the second device, where an operation type of the preset operation is an operation type indicated by the function identifier in the first packet.

According to the method provided in this disclosure, the second device (for example, a remote device) may perform the preset operation on the local data of the second device in response to the RMFC-type packet from the first device (for example, a local device). The RMFC-type packet is a protocol packet after an RDMA protocol is extended in this disclosure. In this way, through implementation of the method provided in this disclosure, an objective of operating the local data of the second device by the first device is implemented. In addition, compared with a receive operation in the RDMA protocol before extension for which a data query request written by the NIC of the second device into a receive buffer can be responded to only after a processor of the second device performs polling processing, in this disclosure, after receiving the RMFC-type packet, the NIC of the second device notifies the processing unit of the second device to process the packet in a timely manner, so that the processing unit of the second device performs the preset operation on the local data of the second device in a timely manner. It can be learned that, the method provided in this disclosure improves processing efficiency of data request content (for example, a data query request) indicated by a data payload in the RMFC-type packet. In other words, the method in this disclosure improves efficiency of operating the local data of the second device by the first device.

In a possible design manner, notifying a processing unit of the second device to perform a preset operation on local data of the second device includes sending a notification message to the processing unit of the second device, where the notification message includes an execution priority of the preset operation, and the notification message notifies the processing unit of the second device to perform the preset operation on the local data of the second device based on the execution priority of the preset operation.

In another possible design manner, notifying a processing unit of the second device to perform a preset operation on local data of the second device includes sending a notification message to a scheduling unit of the second device, where the scheduling unit is configured to schedule an execution sequence of a task in the processing unit of the second device, the notification message includes an execution priority of the preset operation, and the notification message notifies the scheduling unit to schedule an execution sequence of the preset operation for the processing unit based on the execution priority of the preset operation, so that the processing unit performs the preset operation on the local data of the second device based on the execution sequence.

In this possible design manner, before the processing unit of the second device performs the preset operation, the scheduling unit of the second device schedules the execution sequence of the preset operation in advance. In this way, a process of scheduling the execution sequence of the preset operation by the processing unit of the second device is avoided. It can be learned that the method can save computing resources of the processing unit of the second device.

In another possible design manner, the operation type of the preset operation includes any one of a query operation, an insert operation, or a delete operation.

In this possible design manner, the first device may efficiently implement an operation on the local data of the second device, for example, implement the query operation, the insert operation, or the delete operation.

In another possible design manner, if the operation type of the preset operation is the query operation, the method further includes sending, to the first device, a second packet used to carry target data, where the target data is data obtained after the second device performs the query operation on the local data of the second device.

In another possible design manner, the function identifier in the first packet is determined by the first device based on a data request sent by an application process running in the first device.

According to a third aspect, this disclosure provides a remote data access apparatus. The remote data access apparatus is configured to perform any method provided in the first aspect. In this disclosure, the remote data access apparatus is divided into functional modules according to any method provided in the first aspect. For example, each functional module may be obtained through division based on each corresponding function, or two or more functions may be integrated into one processing module. For example, in this disclosure, the remote data access apparatus may be divided into a generation unit, a sending unit, and the like based on functions. For descriptions of possible technical solutions performed by the functional modules obtained through division and beneficial effects, refer to the technical solutions provided in the first aspect or the corresponding possible designs of the first aspect. Details are not described herein again.

According to a fourth aspect, this disclosure provides a remote data access apparatus. The remote data access apparatus is configured to perform any method provided in the second aspect. In this disclosure, the remote data access apparatus is divided into functional modules according to any method provided in the second aspect. For example, each functional module may be obtained through division based on each corresponding function, or two or more functions may be integrated into one processing module. For example, in this disclosure, the remote data access apparatus may be divided into a receiving unit, a notification unit, and the like based on functions. For descriptions of possible technical solutions performed by the functional modules obtained through division and beneficial effects, refer to the technical solutions provided in the second aspect or the corresponding possible designs of the second aspect. Details are not described herein again.

According to a fifth aspect, this disclosure provides a NIC. The NIC has an RDMA function, and the NIC includes one or more processors and a transmission interface. The one or more processors receive or send data through the transmission interface, and the one or more processors are configured to invoke program instructions stored in a memory to perform any method according to any one of the first aspect and the possible design manners of the first aspect or any method according to any one of the second aspect and the possible design manners of the second aspect.

According to a sixth aspect, this disclosure provides a host device. The host device is configured with a NIC having an RDMA function, and the NIC is configured to perform any method according to any one of the first aspect and the possible design manners of the first aspect or any method according to any one of the second aspect and the possible design manners of the second aspect.

According to a seventh aspect, this disclosure provides a remote data access system. The system includes a first device and a second device, the first device is connected to and communicates with the second device, and the first device and the second device each are configured with a NIC having an RDMA function. A NIC of the first device is configured to perform any method according to any one of the first aspect and the possible design manners of the first aspect, and a NIC of the second device is configured to perform any method according to any one of the second aspect and the possible design manners of the second aspect.

According to an eighth aspect, this disclosure provides a computer-readable storage medium. The computer-readable storage medium includes program instructions. When the program instructions are run on a processor, the processor is enabled to perform any method provided in any possible implementation of the first aspect or the second aspect.

According to a ninth aspect, this disclosure provides a computer program product.

When the computer program product runs on a remote data access apparatus, any method provided in any possible implementation of the first aspect or the second aspect is performed.

According to a tenth aspect, this disclosure provides a chip system. The chip system includes a processor, where the processor is configured to invoke a computer program from a memory and run the computer program stored in the memory, to perform any method provided in an implementation of the first aspect or the second aspect.

It may be understood that any apparatus, device, computer storage medium, computer program product, chip system, or the like provided above may be applied to a corresponding method provided above. Therefore, for beneficial effects that can be achieved by the apparatus, device, computer storage medium, computer program product, chip system, or the like, refer to the beneficial effects in the corresponding method. Details are not described herein again.

In this disclosure, a name of the remote data access apparatus constitutes no limitation on devices or functional modules. During actual implementation, these devices or functional modules may appear with other names. As long as functions of the devices or functional modules are similar to those in this disclosure, the devices or functional modules fall within the scope of the claims of this disclosure and their equivalent technologies.

DESCRIPTION OF EMBODIMENTS

Figure 1:
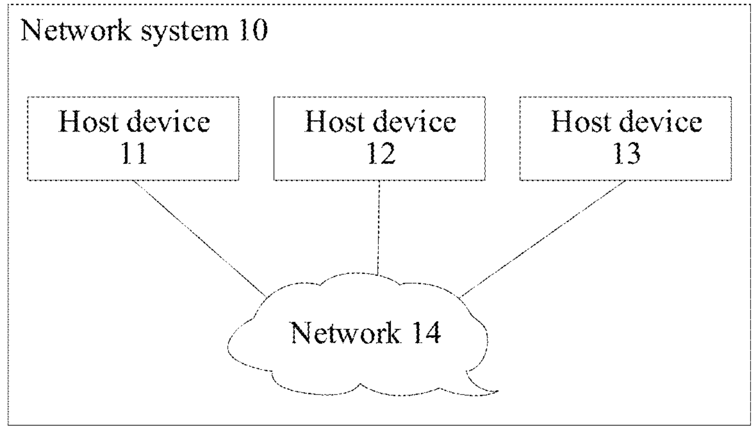
FIG. 1 is a schematic diagram of an architecture of a network system according to an embodiment of this disclosure.

To understand embodiments of this disclosure more clearly, the following describes some terms or technologies in embodiments of this disclosure.

(1) RDMA

An RDMA protocol supports a plurality of RDMA operations. The RDMA operation is used by a host device (for example, a local device) to directly store (write) and fetch (read) memory of another host device (for example, a remote device).

A mainstream implementation of the RDMA protocol is usually sending and receiving data by using a QP. One QP includes one SQ and one RQ. The SQ includes at least one SQE, and one SQE indicates one RDMA operation of a request end. The RQ includes at least one RQE, and one RQE indicates a response end to process one RDMA message. It may be understood that both the SQ and the RQ are first-in first-out queues.

It should be noted that in embodiments of this disclosure, an end that sends an RDMA operation request packet is referred to as a request end, and an end that receives the RDMA operation request packet is referred to as a response end. It may be understood that for a same host device, in different cases, the host device may be a request end that sends an RDMA operation request, or may be a response end that receives an RDMA operation request. This is not limited.

In addition, one or more QPs may be associated with one or two CQs. A CQ associated with one QP is used as an example. If the QP is associated with one CQ, it indicates that an SQ and an RQ in the QP share one CQ. If the QP is associated with two CQs, it indicates that an SQ and an RQ in the QP each are associated with one CQ.

The CQ includes at least one CQE, and one CQE indicates a request end or a response end to complete one RDMA operation. Certainly, the CQ may alternatively be empty, in other words, the CQ does not include a CQE. This is not limited. It may be understood that the CQ is a first-in first-out queue.

RDMA operations include one-sided operations and two-sided operations. The one-sided operations include a read operation and a write operation, and the two-sided operations include a send operation and a receive operation.

It should be noted that the read operation and the write operation are two independent RDMA operations, and the send operation and the receive operation are a group of corresponding RDMA operations, in other words, when a request end performs the send operation, a corresponding response end performs the receive operation.

It should be further noted that the one-sided operation does not require participation of an operating system of the response end, and the two-sided operation requires participation of the operating system of the response end, for example, pre-allocation of a receive buffer.

The following describes in detail, by using specific examples, procedures of the two-sided operations and the one-sided operations.

Example 1

That a local device 11 reads memory data of a remote device 12 is used as an example to describe in detail a procedure of the read operation supported by the RDMA protocol.

S11: The local device 11 determines an identifier of to-be-read data based on an indication of an application process, and determines an address of a send buffer that is in the remote device 12 and that is used to store the to-be-read data.

As a request end of a read operation, the local device 11 may obtain in advance an identifier of data allowed to be read in the remote device 12 (that is, a response end of the read operation), and obtain an address of a send buffer that is in the remote device 12 and that is used to store the data allowed to be read. In this way, after determining the identifier of the to-be-read data based on the indication of the application process, the local device 11 may determine the address of the send buffer that is in the remote device 12 and that is used to store the to-be-read data based on the obtained identifier of the data allowed to be read in the remote device 12 and the address of the send buffer that is in the remote device 12 and that is used to store the data allowed to be read. For example, the local device 11 may perform matching in the obtained identifier of the data allowed to be read in the remote device 12 by using the identifier of the to-be-read data, obtain an address, in a send buffer of the remote device 12, of data that is allowed to be read and that corresponds to a matched identifier, and determine the address as the address of the send buffer that is in the remote device 12 and that is used to store the to-be-read data.

The identifier of the data may be, for example, a name of the data or an identity document (ID) of the data. Certainly, the identifier is not limited thereto.

The address of the send buffer that is in the remote device 12 and that is used to store the data allowed to be read may be a physical address or a logical address. This is not limited.

Optionally, a process in which the local device 11 obtains in advance the identifier of the data allowed to be read in the remote device 12 and the address of the send buffer used to store the data allowed to be read may be completed by performing a send operation by the remote device 12 and performing a receive operation by the local device 11. It should be understood that for the remote device 12 that performs the send operation, the remote device 12 is a request end that sends a send packet. For the local device 11 that performs the receive operation, the local device 11 is a response end that receives the send packet. For procedures of the send operation and the receive operation, refer to descriptions of S21 to S27 below. Details are not described herein again.

S12: The local device 11 generates an SQE 1 based on the address of the send buffer that is in the remote device 12 and that is used to store the to-be-read data, and writes the SQE 1 into an SQ corresponding to the application process.

Optionally, the SQE 1 may be generated by the application process run by the local device 11, or may be generated by a NIC of the local device 11 based on indication information of the application process. This is not limited.

In addition to the address of the send buffer that is in the remote device 12 and that is used to store the to-be-read data, the SQE 1 further includes an address of a receive buffer that is allocated by the local device 11 and that is used to write the to-be-read data, a network address of the remote device 12, and an operation code (opcode) of the read operation. The network address of the remote device 12 may be, for example, an Internet Protocol (IP) address of the remote device 12, a media access control (MAC) address of the remote device 12, or an ID used to uniquely identify the remote device 12 in a network. This is not limited thereto.

The SQ corresponding to the application process is an SQ in a QP corresponding to the application process. Optionally, the local device 11 may include a plurality of QPs, and each QP may correspond to a different application process run by the local device 11. Usually, an association relationship between an application process and a QP may be established by configuring a QP number (QPN) of the QP in a configuration file of the application process.

S13: The NIC of the local device 11 generates a read packet based on the SQE 1 in the SQ.

Further, because the SQ is a first-in first-out queue, the NIC of the local device 11 sequentially processes SQEs in the SQ starting from a head SQE (that is, the 1st SQE that is close to an exit side in the SQ) in the SQ. When processing the SQE 1, the NIC of the local device 11 generates the read packet based on the address of the send buffer that is in the remote device 12 and that is used to store the to-be-read data, the network address of the remote device 12, and the operation code of the read operation in the SQE 1. The read packet includes the address of the send buffer that is in the remote device 12 and that is used to store the to-be-read data, the operation code of the read operation, and a transaction sequence number (hic transaction sequence number (HSN)) used to uniquely identify the read packet. It can be learned that the HSN in the read packet uniquely corresponds to the SQE 1 used to generate the read packet. In addition, a destination address of the read packet is the network address of the remote device 12.

Optionally, the read packet generated by the local device 11 may further include the address of the receive buffer that is allocated by the local device 11 and that is used to write the to-be-read data. In this case, the read packet may not include the HSN.

S14: The NIC of the local device 11 sends the read packet to the remote device 12 through the network.

S15: A NIC of the remote device 12 determines that a received packet is a read packet, reads the to-be-read data from the address that is carried in the read packet and that is of the send buffer used to store the to-be-read data, and generates a response packet used to carry the to-be-read data.

After determining that an operation code in the received packet is an operation code of a read packet, the NIC of the remote device 12 can determine that the packet is a read packet.

Optionally, the NIC of the remote device 12 reads the to-be-read data from the address that is carried in the read packet and that is of the send buffer used to store the to-be-read data, and generates, based on the read to-be-read data, the response packet used to carry the to-be-read data. It should be understood that, in addition to the to-be-read data, the response packet further includes the HSN in the read packet received by the remote device 12. In addition, a destination address of the response packet is a network address of the local device 11 that sends the read packet.

Optionally, when the read packet includes the address of the receive buffer that is allocated by the local device 11 and that is used to write the to-be-read data, the NIC of the remote device 12 reads the to-be-read data from the address that is carried in the read packet and that is of the send buffer used to store the to-be-read data, and generates, based on the read to-be-read data and the address, carried in the read packet, of the receive buffer that is allocated by the local device 11 and that is used to write the to-be-read data, the response packet used to carry the to-be-read data. It should be understood that a destination address of the response packet is a network address of the local device 11 that sends the read packet.

S16: The NIC of the remote device 12 returns, to the local device 11, the response packet used to carry the to-be-read data.

S17: The NIC of the local device 11 receives the response packet used to carry the to-be-read data, and writes the to-be-read data carried in the response packet into the address that is carried in the response packet and that is of the receive buffer used to write the to-be-read data.

Optionally, if the response packet received by the local device 11 includes the HSN, the local device 11 may determine, based on the HSN, the SQE 1 that uniquely corresponds to the HSN, and writes the to-be-read data carried in the response packet into the address that is included in the SQE 1 and that is of the receive buffer used to write the to-be-read data.

Optionally, if the response packet received by the local device 11 includes the address of the receive buffer that is allocated by the local device 11 and that is used to write the to-be-read data, the NIC of the local device 11 directly writes the to-be-read data carried in the response packet into the address of the receive buffer used to write the to-be-read data.

S18: The NIC of the local device 11 writes a CQE 1 into a CQ corresponding to the application process, where the CQE 1 indicates that the NIC of the local device 11 has written the to-be-read data into the receive buffer.

In this case, the local device 11 and the remote device 12 complete one read operation.

Example 2

That a local device sends data to a remote device is used as an example to describe in detail procedures of the send operation and the receive operation.

S21: The local device writes to-be-sent data into a send buffer, generates an SQE 1 based on an address of the send buffer, and writes the SQE 1 into an SQ.

Optionally, the SQE 1 may be generated by an application process run by the local device, or may be generated by a NIC of the local device based on indication information of the application process. This is not limited. Then, the local device writes the generated SQE 1 into the SQ corresponding to the application process. For related descriptions of the SQ corresponding to the application process, refer to related descriptions in S12. Details are not described herein again.

S22: The NIC of the local device generates a send packet based on the SQE 1 in the SQ.

Because the SQ is a first-in first-out queue, the NIC of the local device sequentially processes SQEs in the SQ starting from a head SQE (that is, the 1st SQE that is close to an exit side in the SQ) in the SQ. When processing the SQE 1, the NIC of the local device reads the to-be-sent data from the address that is in the SQE 1 and that is of the send buffer used to store the to-be-sent data, and generates the send packet based on the read to-be-sent data and an operation code of a send operation in the SQE 1. The send packet is used to carry the to-be-sent data, the send packet includes the operation code of the send operation, and a destination address of the send packet is a network address of the remote device.

It should be understood that the send packet generated by the local device further includes a QPN indicating a QP that is in the remote device receiving the send packet and that processes the send packet.

It should be noted that, in the RDMA protocol, a length of data that can be carried in one send packet is limited. Therefore, when a length of the to-be-sent data in the send buffer indicated by the SQE 1 is greater than a maximum length of data that can be carried in one send packet, the NIC of the local device may generate a plurality of send packets based on the SQE 1. The plurality of send packets are jointly used to carry the to-be-sent data in the send buffer indicated by the SQE 1, and the plurality of send packets are usually referred to as one message. It can be learned that one SQE corresponds to one message and one or more send packets.

S23: The NIC of the local device sends the generated send packet to the remote device.

S24: A NIC of the remote device determines that a received packet is a send packet, and writes the to-be-sent data carried in the send packet into a receive buffer indicated by a head RQE in an RQ.

After determining that an operation code in the received packet is an operation code of a send packet, the NIC of the remote device determines that the packet is a send packet.

Then, the remote device writes the to-be-sent data carried in the received send packet into the receive buffer indicated by the head RQE of the RQ in the QP indicated by the QPN in the send packet. The RQ includes one or more RQEs, and each RQE includes an address of a receive buffer that is pre-allocated by the remote device and that is used to write data. For a first-in first-out RQ, a head RQE in the RQ is the first RQE that is close to an exit side in the RQ.

S25: The NIC of the remote device writes a CQE 1 into a CQ of the remote device, where the CQE 1 indicates that the NIC of the remote device has written the to-be-sent data carried in the received send packet into the receive buffer.

S26: When a reliable QP connection is established between a QP 1 in the local device and the QP in the remote device, the NIC of the remote device returns an acknowledge (ACK) packet to the local device.

The QP connection may be understood as a logical connection, and is usually implemented by configuring a parameter. Details are not described herein.

It should be understood that one send packet corresponds to one ACK packet, or a plurality of send packets correspond to one ACK packet.

S27: After receiving ACK packets that are of all send packets corresponding to the SQE 1 and that are returned by the remote device, the local device writes a CQE 2 into a CQ of the local device. The CQE 2 indicates that the NIC of the remote device has received the send packet and has written the to-be-sent data carried in the send packet into the receive buffer.

It may be understood that when no QP connection is established between the QP 1 in the local device and the QP in the remote device, after completing sending of all the send packets corresponding to the SQE 1, the local device writes the CQE 2 into the CQ of the local device. In this case, the CQE 2 indicates that the local device has completed sending of the to-be-sent data.

In this case, the local device completes the send operation, and the remote device completes a receive operation.

(2) Other Terms

In embodiments of this disclosure, terms such as "example", "as an example", or "for example" are used to represent giving an example, an illustration, or a description. Any embodiment or design scheme described as an "example" or "for example" in embodiments of this disclosure should not be explained as being more preferred or having more advantages than another embodiment or design scheme. Exactly, use of the terms such as "example", "as an example", or "for example" is intended to present a relative concept in a specific manner.

In embodiments of this disclosure, terms "first" and "second" are merely used for the purpose of description, and shall not be understood as indicating or implying relative importance or implicitly indicating a quantity of indicated technical features. Therefore, a feature limited by "first" or "second" may explicitly or implicitly include one or more such features.

The term "at least one" in this disclosure means one or more, and the term "a plurality of" in this disclosure means two or more. For example, a plurality of second packets mean two or more second packets. Terms "system" and "network" may be usually used interchangeably in this specification.

When a local device in a data center queries data in a memory database of a remote device across networks, a read operation in an RDMA protocol may be used for implementation. Further, the local device may perform a read operation to read the memory database of the remote device into a local memory, and then query the database. In this way, the local device queries the memory database of the remote device. For specific descriptions of the read operation, refer to the descriptions of S11 to S18. Details are not described herein again.

However, when the memory database in the remote device includes a large amount of data, the local device and the remote device need to interact with each other for a plurality of times to enable the local device to read the memory database of the remote device locally. Consequently, when the local device in the data center queries the data in the memory database of the remote device across the networks by using the read operation in the RDMA protocol, consumed time is long, efficiency is low, and a large quantity of network bandwidth resources are consumed.

Alternatively, when a local device in a data center queries data in a memory database of a remote device across networks, a send operation and a receive operation in an RDMA protocol are used for implementation. Further, the local device may first perform a send operation to send, to the remote device, a data query request of the local device for querying the memory database of the remote device. Then, the remote device performs a receive operation to receive the data query request sent by the local device, and writes the received data query request into a receive buffer. Further, to enable the remote device to obtain the data query request of the receive buffer, a plurality of polling threads need to be run on a processor of the remote device. The processor of the remote device obtains, in a manner of a plurality of times of polling, the data query request written into the receive buffer, and responds to the data query request, to find target data in the local memory database. Then, the found target data is sent to the local device by using a send operation or a write operation. When the remote device sends the target data found in the local memory database to the local device by performing a send operation, the local device receives, by performing a receive operation, the target data found by the remote device. In this way, the local device queries the memory database in the remote device. A detailed process of the write operation is not described in detail in embodiments of this disclosure. For specific descriptions of the send operation and the receive operation, refer to the descriptions of S21 to S27. Details are not described herein again.

However, when the processor of the remote device currently executes a large quantity of thread tasks, the data query request written by the remote device into the receive buffer needs to wait for a long time before being processed by the processor of the remote device. Consequently, efficiency of querying local data of the remote device by the local device is low. In addition, after the remote device responds to the data query request of the local device, if a data volume of the found target data is large, when the remote device sends the target data found in the local memory database to the local device by performing the send operation, and the local device performs the receive operation to write the target data into a receive buffer indicated by an RQE in an RQ of the local device, if a length of the target data is greater than a length of the receive buffer, the local device reports an error or directly discards the received target data. Consequently, the local device fails to query the memory database in the remote device.

Based on this, embodiments of this disclosure provide a remote data access method. The method is applied to a first device (corresponding to the local device), the first device and a second device (corresponding to the remote device) are communicatively connected through a network, and the first device and the second device each are configured with a NIC having an RDMA function. In the method, the RDMA protocol is extended, so that the first device indicates, by using a packet (namely, a first packet) in an extended RDMA protocol, the second device to perform a preset operation on local data of the second device. The preset operation is, for example, a query operation, an insert operation, or a delete operation. In this way, by using the extended RDMA protocol, in addition to implementing direct storage (writing) and fetching (reading) of a memory of the remote device by the local device in the RDMA protocol before extension, the remote device can be efficiently controlled to perform an operation on the local data of the remote device, for example, perform a query operation, an insert operation, or a delete operation.

Further, when the first packet generated by a NIC of the first device and sent to the second device indicates the second device to perform the query operation on the local data of the second device, the second device returns found target data (namely, data carried in a second packet in embodiments of this disclosure) to the first device by using a send operation after performing the query operation. Even if a length of the target data returned by the second device to the first device is greater than a length of a receive buffer of the first device, the first device may still complete, by invoking an extended buffer, receiving of the data returned by the second device.

The local data of the second device may be data stored in the memory of the second device, data stored in a hard disk of the second device, or the like. Certainly, this is not limited thereto. For ease of description, in embodiments of this disclosure, an example in which the local data of the second device is memory data of the second device is used for description below.

An embodiment of this disclosure further provides a network system, and the remote data access method may be applied to the network system. The network system includes a plurality of host devices. The plurality of host devices all support an extended RDMA protocol in this disclosure, and the plurality of host devices are connected to and communicate with each other through a network. For example, the network system is a network system in which a data center is located.

The extended RDMA protocol in embodiments of this disclosure supports an RMFC operation. Through implementation of the RMFC operation, a local device can efficiently control a remote device to perform a preset operation on memory data of the remote device, for example, perform a query operation, an insert operation, or a delete operation on the memory data.

It should be understood that any host device in the plurality of host devices may be used as the first device in embodiments of this disclosure, namely, the local device, and another host device in the plurality of host devices other than the any host device may be used as the second device in embodiments of this disclosure, namely, the remote device.

FIG. 1 is a schematic diagram of an architecture of a network system 10 according to an embodiment of this disclosure. As shown in FIG. 1, the network system 10 includes a host device 11, a host device 12, and a host device 13. The host device 11, the host device 12, and the host device 13 all support an extended RDMA protocol in embodiments of this disclosure, and may be connected and communicate through a network 14. For example, the network 14 may be a public network, an intranet in which a data center is located, an enterprise intranet, or a school intranet. This is not limited in this embodiment of this disclosure.

It may be understood that, when the host device 11 in the network system 10 is the first device, the second device may be any host device other than the host device 11 in the network system 10, for example, the host device 12 or the host device 13.

It should be further understood that, for the first device (for example, the host device 11) in the network system 10, the first device may remotely store (read) and fetch (write) memory data of the second device (for example, the host device 12 or the host device 13) in the network system 10 by performing an RDMA operation, and may further efficiently control the second device to perform a preset operation on the memory data of the second device. The preset operation is, for example, a query operation, an insert operation, or a delete operation. This is not limited thereto.

An embodiment of this disclosure further provides a remote data access apparatus. The apparatus may be any host device in the network system or a functional module in the host device. This is not limited in this embodiment of this disclosure. For example, the host device is the host device 11 in the network system 10 shown in FIG. 1.

Figure 2:
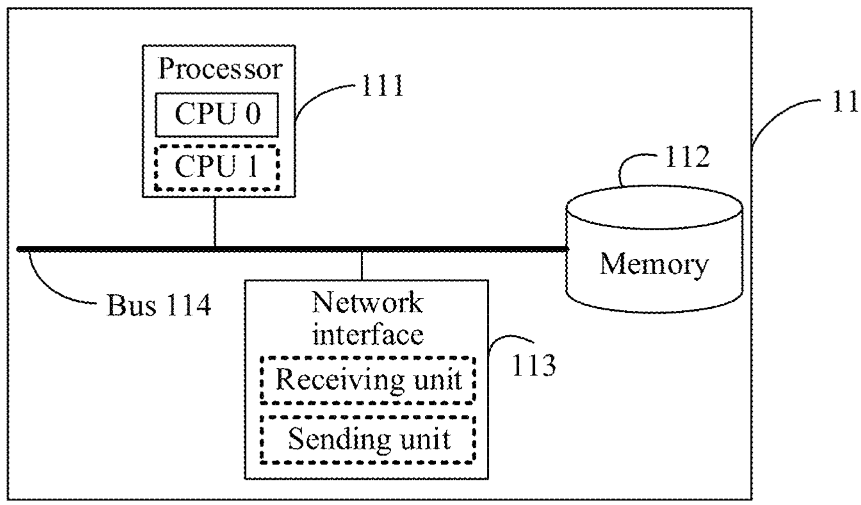
FIG. 2 is a schematic diagram of a hardware structure of a host device according to an embodiment of this disclosure.

For example, the remote data access apparatus is the host device 11 in the network system 10 shown in FIG. 1. FIG. 2 is a schematic diagram of a hardware structure of the host device 11 according to an embodiment of this disclosure. As shown in FIG. 2, the host device 11 includes a processor 111, a memory 112, a network interface 113, and a bus 114. The processor 111, the memory 112, and the network interface 113 are connected through the bus 114.

The processor 111 is a control center of the host device 11 and may be a general-purpose CPU, or the processor 111 may be another general-purpose processor, a digital signal processor (DSP), an application-specific integrated circuit (ASIC), a field-programmable gate array (FPGA) or another programmable logic device, a discrete gate or a transistor logic device, a discrete hardware component, a graphics processing unit (GPU), a neural processing unit (NPU), a tensor processing unit (TPU) or an artificial intelligence chip, a data processing unit (DPU), or the like.

In an example, the processor 111 may include one or more CPUs, for example, a CPU 0 and a CPU 1 shown in FIG. 2. In addition, a quantity of processor cores in each processor is not limited in this disclosure.

The memory 112 is configured to store program instructions or data (for example, a memory database) to be accessed by an application process. The processor 111 may execute the program instructions in the memory 112, to implement a method part performed by the processor in the remote data access method provided in embodiments of this disclosure.

The memory 112 includes a volatile memory or a non-volatile memory, or may include both a volatile memory and a non-volatile memory. The volatile memory may be a read-only memory (ROM), a programmable ROM (PROM), an erasable PROM (EPROM), an electrically EPROM (EEPROM), or a flash memory. The volatile memory may be a random-access memory (RAM) and is used as an external cache. By way of example, and not limitation, RAMs in many forms may be used, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct Rambus (DR) RAM. The non-volatile memory may be a storage class memory (SCM), a solid-state drive (SSD), a mechanical hard disk drive (HDD), or the like. The storage class memory may be, for example, a non-volatile memory (NVM), a phase-change memory (PCM), a persistent memory, or the like.

In a possible implementation, the memory 112 exists independently of the processor 111. The memory 112 is connected to the processor 111 through the bus 114, and is configured to store data, instructions, or program code. When the processor 111 invokes and executes the instructions or program code stored in the memory 112, the method part performed by the processor in the remote data access method provided in embodiments of this disclosure can be implemented.

In another possible implementation, the memory 112 and the processor 111 are integrated.

The network interface 113 is configured to connect the host device 11 and another device (for example, the host device 12 or the host device 13 in the network system 10)

through a communication network, and the communication network may be the Ethernet, a radio access network (RAN), a wireless local area network (WLAN), or the like. The network interface 113 includes a receiving unit configured to receive data/a packet, and a sending unit configured to send data/a packet.

In this embodiment of this disclosure, the network interface 113 may be a NIC that supports an extended RDMA protocol in embodiments of this disclosure. The NIC may perform an RDMA operation, to implement a method part performed by the NIC in the remote data access method provided in embodiments of this disclosure.

The NIC that supports the extended RDMA protocol in embodiments of this disclosure may be an independent Peripheral Component Interconnect Express (PCIe) network card, or may be a network interface unit integrated into a system-on-chip (SoC) chip. This is not limited in this embodiment of this disclosure.

In addition, in this embodiment of this disclosure, the NIC supporting the extended RDMA protocol is used as an external device of the host device 11, and the processor 111 of the host device 11 may allocate a memory segment to the NIC, and establish at least one QP, at least one CQ, and at least one extended QP on the memory segment. For descriptions of the extended QP, refer to descriptions in the following method. Details are not described herein.

Optionally, the host device 11 may perform network communication with another host device (for example, the host device 12) in the network system 10 through a QP connection. QP connections include a reliable connection and an unreliable connection. When the QP connection is a reliable connection, after completing receiving of a packet sent by a request end, the host device serving as a response end may send an ACK packet to the request end, to notify the request end that the response end has completed receiving of the packet sent by the request end.

It should be understood that a hardware setting manner and a function of the NIC that supports the extended RDMA protocol in embodiments of this disclosure are the same as those of a hardware device of a NIC that supports an RDMA protocol. Details are not described.

The bus 114 may be an Industry Standard Architecture (ISA) bus, a Peripheral Component Interconnect (PCI) bus, a high-speed serial computer extended bus, a Compute Express Link (CXL) bus, an Extended ISA (EISA) bus, or the like. Buses may be classified into an address bus, a data bus, a control bus, and the like. For ease of representation, the bus is represented by using only one thick line in FIG. 2. However, it does not mean that there is only one bus or only one type of bus.

It should be noted that the structure shown in FIG. 2 does not constitute a limitation on the host device 11. In addition to the components shown in FIG. 2, the host device 11 may include more or fewer components than those shown in FIG. 2, or some components may be combined, or different component arrangements may be used.

The following describes the remote data access method provided in embodiments of this disclosure with reference to the accompanying drawings.

Figures 3, 4A:
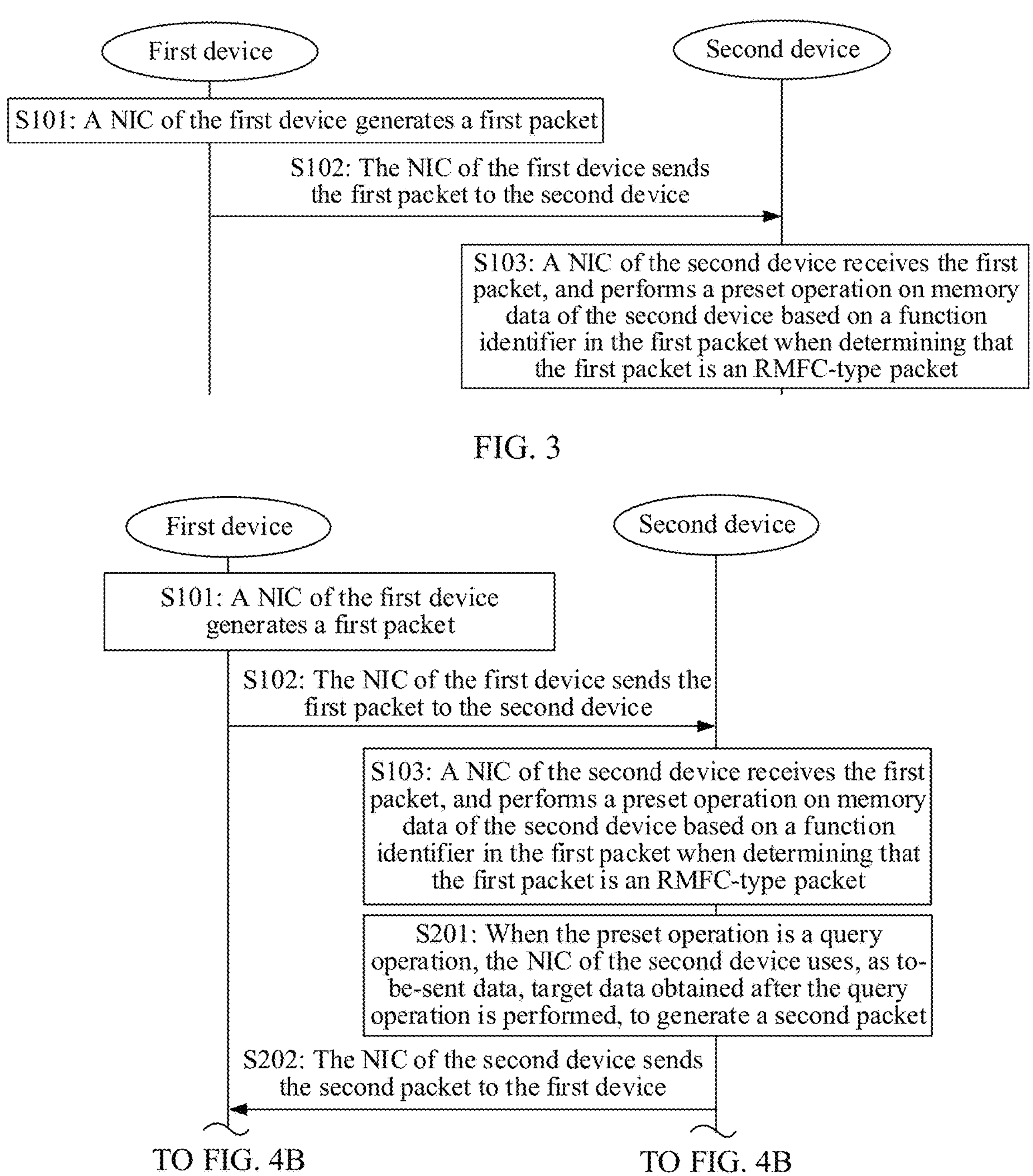
FIG. 3 is a schematic flowchart of a remote data access method according to an embodiment of this disclosure.
FIG. 4A and FIG. 4B are a schematic flowchart of another remote data access method according to an embodiment of this disclosure.

FIG. 3 is a schematic flowchart of a remote data access method according to an embodiment of this disclosure. The method may be applied to the network system 10 shown in FIG. 1, and is performed by the first device and the second device that are in the network system 10 and that support the extended RDMA protocol in embodiments of this disclosure. The extended RDMA protocol in embodiments of this disclosure supports an RMFC operation. It may be understood that, in a process in which the first device and the second device perform an RMFC operation, the first device serving as a local device is a request end of the RMFC operation, and the second device serving as a remote device is a response end of the RMFC operation.

Further, as shown in FIG. 3, a specific procedure of the RMFC operation performed by the first device and the second device includes the following steps:

S101: A NIC of the first device generates a first packet.

The first packet includes a type identifier, the type identifier indicates that the first packet is an RMFC-type packet, and the RMFC-type packet indicates a device that receives the packet to perform a preset operation on local data of the device. In other words, the first packet may indicate a device (for example, the second device) that receives the first packet to perform a preset operation on memory data of the second device. Optionally, the type identifier is, for example, an operation code of the RMFC operation. It may be understood that the first packet is a request-side packet when the first device performs the RMFC operation.

The first packet further includes a function identifier. The function identifier indicates an operation type of the preset operation performed by the second device that receives the first packet on the memory data of the second device. Optionally, the operation type of the preset operation includes any one of a query operation, an insert operation, or a delete operation. This is not limited thereto.

The function identifier in the first packet is determined by the first device based on a data request delivered by an application process run by the first device. It should be understood that, during actual application, the first device runs the application process through a processor (for example, the processor 111 shown in FIG. 2). When the application process needs to access the memory data of the second device, the data request may be determined based on an access requirement. In this way, based on a type of the data request, the first device may determine the type of the preset operation that needs to be performed by the second device.

For example, it is assumed that the data request delivered by the application process run by the first device is that the application process requests to query target data in a database that is locally stored in the second device and whose structure is a B+ tree structure. In this case, based on the data request, the first device determines that the type of the preset operation that needs to be performed by the second device is data query.

Further, after the application process run by the processor of the first device determines the data request based on the requirement of the application process, the following implementations may be performed.

In a first possible implementation, the application process may directly generate, based on the determined data request, a first SQE including a parameter of the data request and the operation code of the RMFC operation. The parameter of the data request includes the function identifier. Optionally, the parameter of the data request further includes parameters such as an HSN and data request content.

The function identifier indicates the operation type of the preset operation, and different values of the function identifier may indicate different operation types. For example, a value 1 of the function identifier indicates the query operation, and a value 2 of the function identifier indicates the insert operation. The HSN is used to uniquely identify the data request, so that when determining that a received packet includes the HSN, the first device determines that the packet is a response packet of the data request. The data request content indicates specific request content of the application process run by the first device. For example, the specific request content of the application process is: querying data with key=90 in a B+ tree structure database whose identifier (or name) is ABC, querying data in a range of (key>12) & (key<33) in the B+ tree structure database whose identifier (or name) is ABC, inserting data a into the B+ tree structure database whose identifier (or name) is ABC, or deleting data b from the B+ tree structure database whose identifier (or name) is ABC. This is not limited.

Then, the application process sends indication information to the NIC, so that the NIC generates the first packet based on the first SQE generated by the application process. The first packet includes the operation code of the RMFC operation and the parameter of the data request. Optionally, the operation code of the RMFC operation may be carried in a packet header of the first packet, and the parameter of the data request may be used as a data payload of the first packet. It can be learned that the operation code of the RMFC operation is the type identifier of the first packet, and the function identifier in the parameter of the data request is the function identifier of the first packet.

In a second possible implementation, the application process writes a parameter of the data request into a send buffer pre-allocated by the first device. When detecting that data content has been written into the send buffer, the NIC of the first device generates, based on the content written into the send buffer, a first SQE including an address of the send buffer, and writes the first SQE into an SQ of a QP corresponding to the application process. For detailed descriptions of the parameter of the data request, refer to the foregoing descriptions. Details are not described herein again.

Optionally, when the application process specifies to send the data request by using the RMFC operation provided in this embodiment of this disclosure, the application process further writes the operation code of the RMFC operation when writing the data request into the send buffer. In other words, in the second possible implementation, in addition to the parameter of the data request, the send buffer indicated by the first SQE generated by the first device further includes the operation code of the RMFC operation.

Optionally, it is assumed that the NIC of the first device can be configured to specify a sending manner of the data request. In this case, when the NIC of the first device specifies to send the data request by using the RMFC operation provided in this embodiment of this disclosure, after determining that data content has been written into the send buffer, the NIC of the first device may generate a first SQE including an address of the send buffer and the operation code of the RMFC operation.

Then, in a process in which the NIC of the first device sequentially processes SQEs in the SQ starting from a head SQE of the SQ in the QP corresponding to the application process, when processing the first SQE, the NIC of the first device generates, based on the first SQE, the first packet including the operation code of the RMFC operation and the parameter of the data request. Optionally, the operation code of the RMFC operation may be carried in a packet header of the first packet, and the parameter of the data request may be used as a data payload of the first packet. In this way, the operation code of the RMFC operation is the type identifier of the first packet, and a function identifier in the parameter of the data request is the function identifier of the first packet.

It should be understood that a destination address of the first packet generated by the NIC of the first device is a network address of the second device. For detailed descriptions of the network address, refer to the foregoing descriptions. Details are not described herein again.

Optionally, the network address of the second device may be a parameter in the data request determined by the application process. This is not limited in this embodiment of this disclosure.

S102: The NIC of the first device sends the first packet to the second device.

Further, the NIC of the first device sends the first packet to the second device through a network.

S103: A NIC of the second device receives the first packet, and performs the preset operation on the memory data of the second device based on the function identifier in the first packet when determining that the first packet is an RMFC-type packet.

The NIC of the second device receives the first packet, and responds to the first packet when determining that the type identifier in the first packet is an identifier of the RMFC-type packet, to perform, on the memory data of the second device, the preset operation whose operation type is the operation type indicated by the function identifier in the first packet. Herein, for descriptions of the preset operation, refer to the foregoing descriptions. Details are not described herein. For brief description, in this embodiment of this disclosure, the preset operation whose operation type is the operation type indicated by the function identifier is referred to as a preset operation corresponding to the function identifier below.

For example, it is assumed that the type identifier in the first packet is an operation code. When the NIC of the second device determines that the operation code in the first packet is the operation code of the RMFC operation, the NIC of the second device may determine that the first packet is an RMFC-type packet. The NIC of the second device may determine, by identifying the operation code in the packet header of the first packet, that the operation code in the first packet is the operation code of the RMFC operation. Alternatively, the NIC of the second device may parse the first packet, to determine that the operation code in the first packet is the operation code of the RMFC operation. This is not limited.

Further, after determining that the first packet is an RMFC-type packet, the NIC of the second device may write the data payload of the first packet into a receive buffer pre-allocated by the second device, and determine, based on the function identifier in the data payload of the first packet, the preset operation corresponding to the function identifier and a processing unit configured to perform the preset operation. The data payload of the first packet is the parameter of the data request of the application process run by the first device. Optionally, the processing unit configured to perform the preset operation is, for example, a processing core configured to perform the preset operation. This is not limited. Herein, the processing core may be a microprocessor in the NIC of the second device, any processing core in a general-purpose processor in the second device, or any dedicated processing core in the second device. This is not limited in this embodiment of this disclosure.

Then, the NIC of the second device may send a notification message to the determined processing unit, to indicate the processing unit to perform the preset operation corresponding to the function identifier on the memory data. Herein, the notification message includes an address of the receive buffer used to write the data payload of the first packet. In this way, after receiving the notification message, the processing unit may obtain, from the address of the receive buffer in the notification message, the data payload written by the NIC at the address, and perform, on the memory data of the second device based on the data request content indicated by the data payload (namely, the parameter of the data request), the preset operation corresponding to the function identifier in the data payload. For specific descriptions of the data request content and the preset operation, refer to the foregoing descriptions. Details are not described herein.

It can be learned that, compared with a receive operation in an RDMA protocol before extension for which a data query request written by the NIC of the second device into a receive buffer can be responded to only after a processor performs polling processing, in this embodiment of this disclosure, when the second device performs the extended RMFC operation, after receiving the first packet and writing the data payload of the first packet into the receive buffer, the NIC of the second device sends the notification message to the processing unit, to indicate the processing unit to process the data payload in the receive buffer in a timely manner. It can be learned that, the method provided in this embodiment of this disclosure can improve processing efficiency of the data request content (for example, a data query request) indicated by the data payload.

Optionally, the notification message may further include an execution priority of the preset operation corresponding to the function identifier in the data payload (namely, the parameter of the data request) of the first packet. In this case, after receiving the first packet, the NIC of the second device further obtains the execution priority from the first packet, and sends, to the processing unit, a notification message including the execution priority and the address of the receive buffer used to write the data payload of the first packet. In this way, after receiving the notification message, the processing unit may obtain the data payload from the address of the receive buffer in the notification message based on the execution priority in the notification message, and perform, on the memory data of the second device based on the data request content indicated by the data payload (namely, the parameter of the data request), the preset operation corresponding to the function identifier in the data payload. The priority of the preset operation indicates an execution sequence of performing the preset operation on the memory data by the processing unit of the second device.

It should be understood that the NIC of the second device may receive a plurality of RMFC-type packets simultaneously or within a short period of time. In this case, a plurality of preset operations corresponding to function identifiers in the plurality of packets may need to be performed by the preset processor. Therefore, the preset processor may determine, based on execution priorities of the plurality of preset operations, execution sequences for performing the plurality of preset operations. Then, the preset processor may sequentially obtain data payloads from corresponding receive buffers based on the execution sequences of the plurality of preset operations, and perform, on the memory data of the second device based on data request content indicated by the data payloads (namely, parameters of data requests), the preset operations corresponding to the function identifiers in the data payloads.

It should be further understood that the processing unit preferentially obtains a data payload from an address of a receive buffer corresponding to a high execution priority and performs a corresponding preset operation, and then obtains a data payload from an address of a receive buffer corresponding to a low execution priority and performs a corresponding preset operation. An address of a receive buffer corresponding to an execution priority is an address of a receive buffer that belongs to a same notification message as the execution priority.

For example, the execution priority may be represented by using a weight coefficient. For example, a high weight coefficient indicates a high execution priority, and a low weight coefficient indicates a low execution priority.

Optionally, a process in which the processing unit of the second device determines, based on the execution priorities of the plurality of preset operations, the execution sequences for performing the plurality of preset operations may be performed by an independent scheduling unit in the second device, to save computing resources of the processing unit. The scheduling unit is configured to schedule an execution sequence of a task in the processing unit.

In this case, after receiving the first packet, obtaining the execution priority from the first packet, writing the data payload of the first packet into the receive buffer pre-allocated by the second device, and determining the processing unit configured to perform the preset operation corresponding to the function identifier in the data payload of the first packet, the NIC of the second device sends, to the scheduling unit configured to schedule the data request for the processing unit, the notification message including the address of the receive buffer used to write the data payload of the first packet and the execution priority obtained from the first packet, so that the scheduling unit determines, based on the received execution priority, the execution sequence of the preset operation corresponding to the execution priority.

For example, the NIC of the second device may send, to the scheduling unit in a doorbell manner, the notification message including the address of the receive buffer used to write the data payload of the first packet and the execution priority obtained from the first packet. This is not limited in this embodiment of this disclosure.

Further, after determining, based on the execution priority in the received notification message, the execution sequence of the preset operation corresponding to the execution priority, the scheduling unit may sequentially send, based on the determined execution sequence, an address of a receive buffer corresponding to the execution priority to the processing unit, so that the processing unit obtains the data payload from the received address of the receive buffer, and performs, on the memory data of the second device based on the data request content indicated by the data payload (namely, the parameter of the data request), the preset operation corresponding to the function identifier in the data payload. The address of the receive buffer corresponding to the execution priority is the address of the receive buffer that belongs to the same notification message as the execution priority.

It may be further understood that the scheduling unit may send the address of the receive buffer to the processing unit when the processing unit has an idle computing resource, so that the processing unit obtains the data payload from the received address of the receive buffer, and performs, on the memory data of the second device based on the data request content indicated by the data payload (namely, the parameter of the data request), the preset operation corresponding to the function identifier in the data payload. Optionally, when the processing unit has an idle computing resource, the processing unit may send indication information for obtaining a data request to the scheduling unit. In response, the scheduling unit may send, to the processing unit, an address of a receive buffer corresponding to the current highest execution priority.

It should be noted that, when the preset operation is a data query operation, after completing performing the data query operation on the memory data of the second device, the processing unit writes found target data into storage space accessible to the NIC of the second device.

Optionally, in a process of performing the data query operation on the memory data of the second device, the processing unit may alternatively write found data into the storage space accessible to the NIC of the second device while performing the query operation, until all found data is written into the storage space.

Further, the NIC of the second device may use the accessible storage space as a send buffer, and use the data written into the storage space as to-be-sent data. Then, the second device performs a send operation, and the first device performs a receive operation, so that an objective of sending the data in the storage space to the first device can be implemented. Because the data in the storage space is target data found by the second device after the second device responds to the first packet, an objective of querying the memory data of the second device by the first device is implemented. For specific descriptions of performing the send operation by the second device and performing the receive operation by the first device, refer to the foregoing descriptions of S21 to S27. Details are not described herein again.

In this way, according to the method described in S101 to S103, the first device performs the extended RMFC operation in this embodiment of this disclosure. Then, the second device performs the send operation, and the first device performs the receive operation corresponding to the send operation. In this way, the objective of querying the memory data of the second device by the first device is implemented. It can be learned from the foregoing descriptions that this process requires only two times of packet exchange between the first device and the second device (to be specific, the first device sends the first packet to the second device, and the second device sends, to the first device, a packet used to carry the target data) for implementation. Compared with an implementation in which a plurality of times of packet exchange are required when the first device performs a read operation to query the memory data of the second device, in this embodiment of this disclosure, the method improves efficiency of querying the memory data of the second device by the first device.

In addition, compared with the RDMA protocol before extension, the extended RDMA protocol in this embodiment of this disclosure can not only be used to remotely store (read) and fetch (write) memory data of the second device, but also be used to control the second device to perform an operation on local data, for example, perform a data query operation, a data insert operation, or a data delete operation.

In addition, compared with the receive operation in the RDMA protocol before extension for which the data query request written by the NIC of the second device into the receive buffer can be responded to only after the processor performs polling processing, in this embodiment of this disclosure, when the second device performs the extended RMFC operation, after receiving the first packet and writing the data payload of the first packet into the receive buffer, the NIC of the second device sends the notification message to the processing unit, to indicate the processing unit to process the data payload in the receive buffer in a timely manner. It can be learned that, the method provided in this embodiment of this disclosure can improve the processing efficiency of the data request content (for example, the data query request) indicated by the data payload in the first packet.

However, when the target data is large, when the first device writes, by performing the receive operation, the target data found by the second device into a receive buffer indicated by an RQE in an RQ of the first device, if a length of the target data is greater than a length of the receive buffer, the first device reports an error or directly discards the received target data. Consequently, the first device fails to query the memory data in the second device.

Figure 4B:
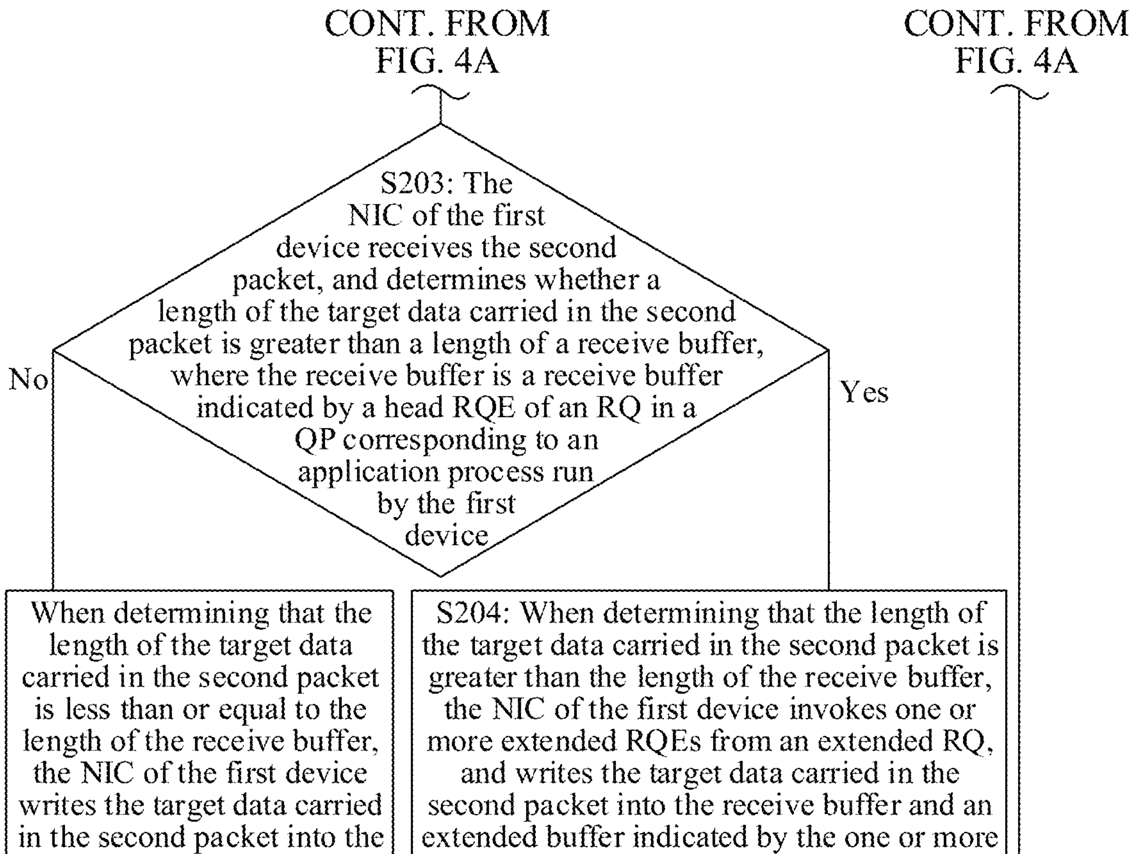

To avoid this problem, refer to FIG. 4A and FIG. 4B. FIG. 4A and FIG. 4B are a schematic flowchart of another remote data access method according to an embodiment of this disclosure. The method is applied to the network system shown in FIG. 1. In the method, after S101 to S103 (for details, refer to the foregoing descriptions, and details are not described herein again) are performed, the following steps continue to be performed, to achieve an objective that the first device can also successfully receive the target data when the target data is large. It may be understood that, in a process in which the first device and the second device perform a send operation provided in this embodiment of this disclosure, the second device serving as the remote device is a request end of the send operation, and the first device serving as the local device is a response end of the send operation.

S201: When the preset operation is the query operation, the NIC of the second device uses, as to-be-sent data, target data obtained after the query operation is performed, to generate a second packet.

The second packet is a send packet. For a process in which the second device generates the second packet based on the target data, refer to the descriptions of generating the send packet in S21 and S22. Details are not described herein again.

It should be noted that the second packet generated by the NIC of the second device includes a transaction sequence number in the data payload of the first packet. In this way, when receiving the second packet, the first device may determine, based on the transaction sequence number, that a data payload of the second packet is response data of the first packet.

It should be further understood that the NIC of the second device may generate one or more second packets. This is not limited in this embodiment of this disclosure.

When the NIC of the second device generates a plurality of second packets, the plurality of second packets may be referred to as one message.

It may be understood that when the NIC of the second device generates a plurality of second packets, it indicates that the NIC of the second device divides the found target data into a plurality of data blocks, and each second packet carries one data block. In this case, each second packet includes an identifier of a data block carried in the second packet.

For example, when the NIC of the second device divides the target data into three data blocks whose identifiers are separately a data block 1, a data block 2, and a data block 3, the NIC of the second device may generate three second packets based on the three data blocks. In addition, optionally, a data block identifier included in the $1^{st}$ second packet is the data block 1, a data block identifier included in the $2^{nd}$ second packet is the data block 2, and a data block identifier included in the $3^{rd}$ second packet is the data block 3.

S202: The NIC of the second device sends the second packet to the first device.

Further, the NIC of the second device sends the second packet to the first device through the network.

It should be understood that, when the second device generates a plurality of second packets, the NIC of the second device sequentially sends the plurality of second packets to the first device.

Optionally, the last second packet sent by the NIC of the second device further includes a last response identifier. It should be understood that the last response identifier indicates that a second packet including the identifier is a second packet that is sent by the second device to the first device and that is used to carry the last data block of the target data (namely, the response data of the first packet). In this way, when receiving the second packet including the last response identifier, the first device may determine that all packets used to carry the response data of the first packet are received.

It should be noted that, when completing sending of all the second packets used to carry the target data, the NIC of the second device writes a first CQE into a CQ. The first CQE indicates that the NIC of the second device has completed sending of the second packet used to carry the target data.

Certainly, if a reliable QP connection exists between the second device and the first device, the second device may write a first CQE into a CQ after receiving an ACK packet that is sent by the first device and that indicates that all the second packets have been received. The first CQE indicates that the NIC of the second device has completed sending of the second packet used to carry the target data, and the first device has completed receiving of the target data carried in the second packet. One second packet may correspond to one ACK packet, or a plurality of second packets may correspond to one ACK packet. This is not limited in this embodiment of this disclosure.

S203: The NIC of the first device receives the second packet, and determines whether a length of the target data carried in the second packet is greater than a length of a receive buffer. The receive buffer is a receive buffer indicated by a head RQE of the RQ in the QP corresponding to the application process run by the first device.

When receiving the second packet, the NIC of the first device may determine, based on the transaction sequence number carried in the second packet, that the data carried in the second packet is the response data of the first packet, in other words, the data carried in the second packet is data requested by the data request delivered by the application process run by the first device.

In this case, when determining that an operation code carried in the received second packet is an operation code of the send packet, the NIC of the first device determines whether the length of the target data carried in the second packet is greater than the length of the receive buffer. The receive buffer is the receive buffer indicated by the head RQE of the RQ in the QP corresponding to the application process run by the first device. For descriptions of the head RQE, refer to the foregoing descriptions. Details are not described herein again.

When determining that the length of the target data carried in the second packet is less than or equal to the length of the receive buffer, the NIC of the first device writes the target data carried in the second packet into the receive buffer.

When determining that the length of the target data carried in the second packet is greater than the length of the receive buffer, the NIC of the first device performs S204.

S204: When determining that the length of the target data carried in the second packet is greater than the length of the receive buffer, the NIC of the first device invokes one or more extended RQEs from an extended RQ, and writes the target data carried in the second packet into the receive buffer and an extended buffer indicated by the one or more extended RQEs.

Further, when determining that the length of the target data carried in the second packet is greater than the length of the receive buffer, the NIC of the first device invokes the one or more extended RQEs from the extended RQ, fills the receive buffer with the target data carried in the second packet, and writes, into the extended buffer indicated by the one or more extended RQEs, data in the target data other than data that has been written into the receive buffer.

Optionally, after receiving the second packet and writing the data carried in the second packet into a buffer (where the buffer may be the receive buffer, or a buffer including the receive buffer and the extended buffer), the NIC of the first device sends an ACK packet to the second device, to notify the second device that the second packet has been received.

It should be noted that the first device is preconfigured with the extended buffer and the extended RQ, the extended RQ includes a plurality of extended RQEs, and each extended RQE includes an address of a segment of extended buffer. It may be understood that when a length of a receive buffer indicated by an RQE of the RQ in the QP is less than a length of received to-be-written data (for example, the target data carried in the second packet), the extended buffer is used to write data that is in the to-be-written data and that exceeds the length of the receive buffer.

It can be learned that, through preconfiguration of the extended RQ and the extended buffer in the first device, when the data carried in the send packet received by the first device is large, and therefore the length of the receive buffer indicated by the head RQE of the RQ in the QP is insufficient for storing the data carried in the send packet, the first device can also invoke the extended RQE in the extended RQ to successfully receive the data carried in the send packet.

In addition, in some embodiments, when there are a plurality of second packets, after receiving the 1st second packet, determining that a transaction sequence number carried in the 1st second packet is the transaction sequence number in the parameter of the data request, and determining that the 1st second packet is a send packet, the NIC of the first device determines whether a length of data carried in the 1st second packet is greater than a length of a receive buffer. The receive buffer is a receive buffer indicated by a head RQE of the RQ in the QP corresponding to the application process run by the first device.

In a possible case, when determining that the length of the data carried in the 1st second packet is less than or equal to the length of the receive buffer, the NIC of the first device writes the data carried in the 1st second packet into the receive buffer.

Then, after receiving the 2nd second packet, determining that a transaction sequence number carried in the 2nd second packet is the transaction sequence number in the parameter of the data request, and determining that the 2nd second packet is a send packet, the NIC of the first device determines whether a length of data carried in the 2nd second packet is greater than a length of an area that is in the receive buffer and into which no data has been written. The receive buffer is the receive buffer indicated by the head RQE of the RQ in the QP corresponding to the application process run by the first device. It should be understood that, in this case, the data carried in the 1st second packet has been written into the receive buffer.

When determining that the length of the data carried in the 2nd second packet is less than or equal to the length of the area that is in the receive buffer and into which no data has been written, the NIC of the first device writes the data carried in the 2nd second packet into the area that is in the receive buffer and into which no data has been written.

When determining that the length of the data carried in the 2nd second packet is greater than the length of the area that is in the receive buffer and into which no data has been written, the NIC of the first device invokes one or more extended RQEs from an extended RQ, fills the area that is in the receive buffer and into which no data has been written with the data carried in the 2nd second packet, and writes, into an extended buffer indicated by the one or more extended RQEs, data in the data carried in the 2nd second packet other than data that has been written into the receive buffer.

By analogy, the process ends until the first device writes, into the receive buffer or into the receive buffer and the extended buffer, all data (namely, the target data) carried in a message to which the second packets belong.

In another possible case, when determining that the length of the data carried in the 1st second packet is greater than the length of the receive buffer, the NIC of the first device invokes one or more extended RQEs from an extended RQ, fills the receive buffer with the data carried in the 1st second packet, and writes, into an extended buffer indicated by the one or more extended RQEs, data in the data carried in the 1st second packet other than data that has been written into the receive buffer.

Then, after receiving the 2nd second packet, determining that a transaction sequence number carried in the 2nd second packet is the transaction sequence number in the parameter of the data request, and determining that the 2nd second packet is a send packet, the NIC of the first device determines whether a length of data carried in the 2nd second packet is greater than a length of an area that is in the extended buffer corresponding to the invoked extended RQE and into which no data has been written (where it should be understood that, in this case, the data carried in the 1st second packet has been written into the extended buffer corresponding to the invoked extended RQE), and further determines whether to continue to invoke the extended RQE to write the data carried in the 2nd second packet.

By analogy, the process ends until the first device writes, into the receive buffer and the extended buffer, all data carried in a message to which the second packets belong.

Further, after the first device writes all data (namely, the target data) carried in a message to which the second packet belongs into the buffer (where the buffer may be the receive buffer, or the buffer including the receive buffer and the extended buffer), the NIC of the first device further performs S205.

S205: The NIC of the first device writes a CQE into a CQ associated with the QP corresponding to the application process run by the first device, where the CQE indicates that the NIC of the first device has written all the target data carried in the second packet into the buffer.

The buffer may be the receive buffer, or the buffer including the receive buffer and the extended buffer.

Further, when the NIC of the first device does not invoke the one or more extended RQEs in a process of writing the target data carried in the received second packet into the buffer, in other words, the buffer used to write the target data does not include the extended buffer, the CQE indicates that the NIC of the first device has written all the target data carried in the second packet into the receive buffer, and the CQE indicates an address of the receive buffer. The receive buffer is the receive buffer indicated by the head RQE of the RQ in the QP corresponding to the application process run by the first device.

When the NIC of the first device invokes the one or more extended RQEs in a process of writing the target data carried in the received second packet into the buffer, the CQE indicates that the first device has written all the target data carried in the second packet into the buffer, where the buffer includes the receive buffer and the extended buffer corresponding to the one or more extended RQEs, and the receive buffer is the receive buffer indicated by the head RQE of the RQ in the QP corresponding to the application process run by the first device. In addition, the CQE indicates addresses of the receive buffer and the extended buffer corresponding to the one or more extended RQEs.

It should be noted that, in this embodiment of this disclosure, an associated CQ does not need to be set for an extended QP. Therefore, after the NIC of the first device writes the target data carried in the received second packet into the receive buffer indicated by the head RQE of the RQ in the QP corresponding to the application process, or after the NIC of the first device writes the target data carried in the received second packet into the receive buffer indicated by the head RQE of the RQ in the QP corresponding to the application process and the extended buffer indicated by the one or more extended RQEs, the CQE only needs to be written into the CQ associated with the QP corresponding to the application process.

During actual application, optionally, the NIC of the first device may write a CQE into the CQ after completing processing of one message, in other words, indicate, by using the CQE, that the processing of the message has been completed. In addition, the CQE includes index information, and the index information indicates an address of a buffer (including a receive buffer and an extended buffer) into which the message is written. For example, the index information is, for example, a linked list header. This is not limited in this embodiment of this disclosure.

Optionally, the NIC of the first device may alternatively write a CQE into the CQ after completing processing of a plurality of messages (for example, after completing sending of all send packets included in the plurality of messages, for another example, after writing all data carried in send packets included in the plurality of messages into a buffer), in other words, indicate, by using the CQE, that the NIC of the first device has completed the processing of the plurality of messages.

When processing the plurality of messages, the NIC of the first device may consume only one RQE in the RQ of the first device, or may consume a plurality of RQEs in the RQ of the first device. This is not limited in this embodiment of this disclosure.

It is assumed that when processing the plurality of messages, the NIC of the first device consumes only one RQE in the RQ of the first device, and further consumes (that is, invokes) one or more extended RQEs in the extended RQ. In this case, after writing all data carried in the plurality of messages into a receive buffer indicated by the consumed RQE and an extended buffer indicated by the one or more invoked extended RQEs, the NIC of the first device writes a CQE into the CQ associated with the QP to which the RQ belongs, to indicate that the processing of the plurality of messages has been completed. The CQE includes index information indicating addresses of the receive buffer and the extended buffer. Herein, the addresses of the receive buffer and the extended buffer are the receive buffer and the extended buffer that are used to write all the data carried in the plurality of messages.

It is assumed that when processing the plurality of messages, the NIC of the first device consumes a plurality of RQEs in the RQ of the first device. For example, a quantity of RQEs in the RQ that are consumed for processing the plurality of messages by the NIC of the first device is the same as a quantity of the plurality of messages. In other words, the NIC of the first device consumes one RQE in the RQ of the first device for processing one message. For any message in the plurality of messages, when processing the any message, the NIC of the first device consumes one RQE in the RQ of the first device, and further consumes (that is, invokes) one or more extended RQEs in the extended RQ. In this case, the NIC of the first device writes all data carried in the any message into a receive buffer indicated by the consumed RQE and an extended buffer indicated by the one or more invoked extended RQEs. Therefore, after completing processing of the any message, the NIC of the first device writes index information indicating addresses of the receive buffer indicated by the RQE and the extended buffer indicated by the one or more extended RQEs into the RQE. Herein, the addresses of the receive buffer and the extended buffer are the receive buffer and the extended buffer that are used to write all the data carried in the any message. In this way, after completing the processing of the plurality of messages, the NIC of the first device writes a CQE into the CQ associated with the QP to which the RQ belongs, to indicate that the processing of the plurality of messages has been completed. The CQE includes a pointer indicating a plurality of consumed RQE addresses.

Optionally, after performing S205, the NIC of the first device may further perform S206.

S206 (optional): After writing all the target data carried in the second packet into the buffer, and migrating the target data written into the buffer to other storage space, the NIC of the first device sends, to the second device, indication information for recycling a credit.

The buffer may be the receive buffer, or the buffer including the receive buffer and the extended buffer.

It should be noted that, after configuring an RQE of the RQ in the QP and an extended RQE in the extended RQ, the first device sends a quantity of configured RQEs, a quantity of configured extended RQEs, a size of a receive buffer corresponding to each RQE, and a size of an extended buffer corresponding to each extended RQE to the second device by using a negotiation packet. In this way, the second device may determine the quantity of configured RQEs and the quantity of configured extended RQEs in the first device, and configure a corresponding quantity of credits. In other words, one credit corresponds to one receive buffer or one extended buffer. Optionally, a size of a buffer corresponding to one RQE or one extended RQE may be indicated by using a parameter of a corresponding credit. For example, the size of the buffer corresponding to one RQE or one extended RQE may be a size (that is, 4K) of a physical page. This is not limited in this embodiment of this disclosure.

One RQE or one extended RQE corresponds to a segment of buffer. The segment of buffer is used by the NIC of the first device to write, after receiving a send packet, data carried in the send packet.

It should be understood that a send packet included in one message sent by the NIC of the second device may consume a receive buffer corresponding to one RQE of the first device, or consume a receive buffer corresponding to one RQE of the first device and an extended buffer corresponding to one or more extended RQEs. A quantity of extended RQEs corresponding to the extended buffer consumed by the NIC of the first device after receiving the send packet included in the message is determined based on a size of data carried in the message.

For example, it is assumed that a send packet included in one message received by the NIC of the first device carries 12K data, and the size of the buffer corresponding to one RQE or one extended RQE is 4K. In this case, the send packet included in the message sent by the NIC of the second device may consume a receive buffer (4K) corresponding to one RQE of the first device, and consume extended buffers (8K) corresponding to two extended RQEs.

In this case, after sending a send packet (for example, one or more second packets used to carry the target data) included in one message to the first device, the NIC of the second device deducts a credit corresponding to a receive buffer indicated by one RQE, and deducts, based on a size of data carried in the message, a credit corresponding to an extended buffer indicated by a corresponding quantity of extended RQEs. Deducting the credit may be, for example, setting an identifier of the credit to "consumed". In this way, the second device may determine in real time whether the first device currently has an available receive buffer corresponding to an RQE and an available extended buffer corresponding to an extended RQE to write data carried in a send packet sent by the second device. If yes, the second device may continue to send the send packet to the first device. If no, the second device stops sending the send packet to the first device.

Therefore, after the NIC of the first device writes all the target data carried in the second packet received from the second device into the buffer (including the receive buffer, or including the receive buffer and the extended buffer), and migrates the target data written into the buffer to the other storage space, it indicates that the buffer is cleared. In other words, the buffer may be re-used to write data carried in a send packet. In this case, the NIC of the first device sends, to the second device, the indication information for recycling the credit. The indication information is used by the second device to recycle the credit, and the indication message may carry a quantity of receive buffers and a quantity of extended buffers for which data migration has been completed, a size of each receive buffer for which data migration has been completed, and a size of each extended buffer for which data migration has been completed.

In response, after receiving the indication message, the NIC of the second device recycles credits corresponding to the receive buffer and the extended buffer for which data migration has been completed. For example, identifiers of the credits corresponding to the receive buffer and the extended buffer that have been originally consumed and for which data migration has been currently completed are set to "not consumed", to implement recycling of the credits by the second device. In this way, the second device may determine that the first device currently has an available receive buffer and an available extended buffer that are used to write data carried in a send packet. Therefore, the second device may continue to send the send packet to the first device.

In this way, according to the method described in S201 to S206, when the length of the target data found by the second device is greater than the length of the receive buffer of the first device, the extended buffer preset by the first device may be invoked to successfully receive the target data.

In conclusion, according to the remote data access method provided in this embodiment of this disclosure, the first device may query the memory data of the second device through implementation of the extended RMFC operation in this embodiment of this disclosure, the send operation of the second device, and the receive operation of the first device.

Compared with an implementation in which a plurality of times of packet exchange are required when the first device performs a read operation in the RDMA protocol before extension to query the memory data of the second device, in the method provided in this embodiment of this disclosure, only two times of packet exchange between the first device and the second device (to be specific, the first device sends the first packet to the second device, and the second device sends, to the first device, a packet used to carry the target data) are required, so that the first device can query the memory data of the second device. In other words, the method provided in this embodiment of this disclosure improves efficiency of querying the memory data of the second device by the first device.

In addition, compared with a receive operation in the RDMA protocol before extension for which a data query request written by the NIC of the second device into a receive buffer can be responded to only after a processor performs polling processing, in this embodiment of this disclosure, when the second device performs the extended RMFC operation, after receiving the first packet and writing the data payload of the first packet into the receive buffer, the NIC of the second device sends the notification message to the processing unit, to indicate the processing unit to process the data payload in the receive buffer in a timely manner. It can be learned that, the method provided in this embodiment of this disclosure can improve processing efficiency of the data request content (for example, the data query request) indicated by the data payload in the first packet.

In addition, in the method provided in this embodiment of this disclosure, through preconfiguration of the extended RQ and the extended buffer in the first device, when an amount of the data carried in the send packet received by the first device is large, and therefore the length of the receive buffer indicated by the head RQE of the RQ in the QP is insufficient for storing the data carried in the send packet, the first device can also invoke the extended RQE in the extended RQ to successfully receive the data carried in the send packet.

To further describe the remote data access method provided in embodiments of this disclosure, the following describes the method by using a specific example.

Figures 5A, 5B:
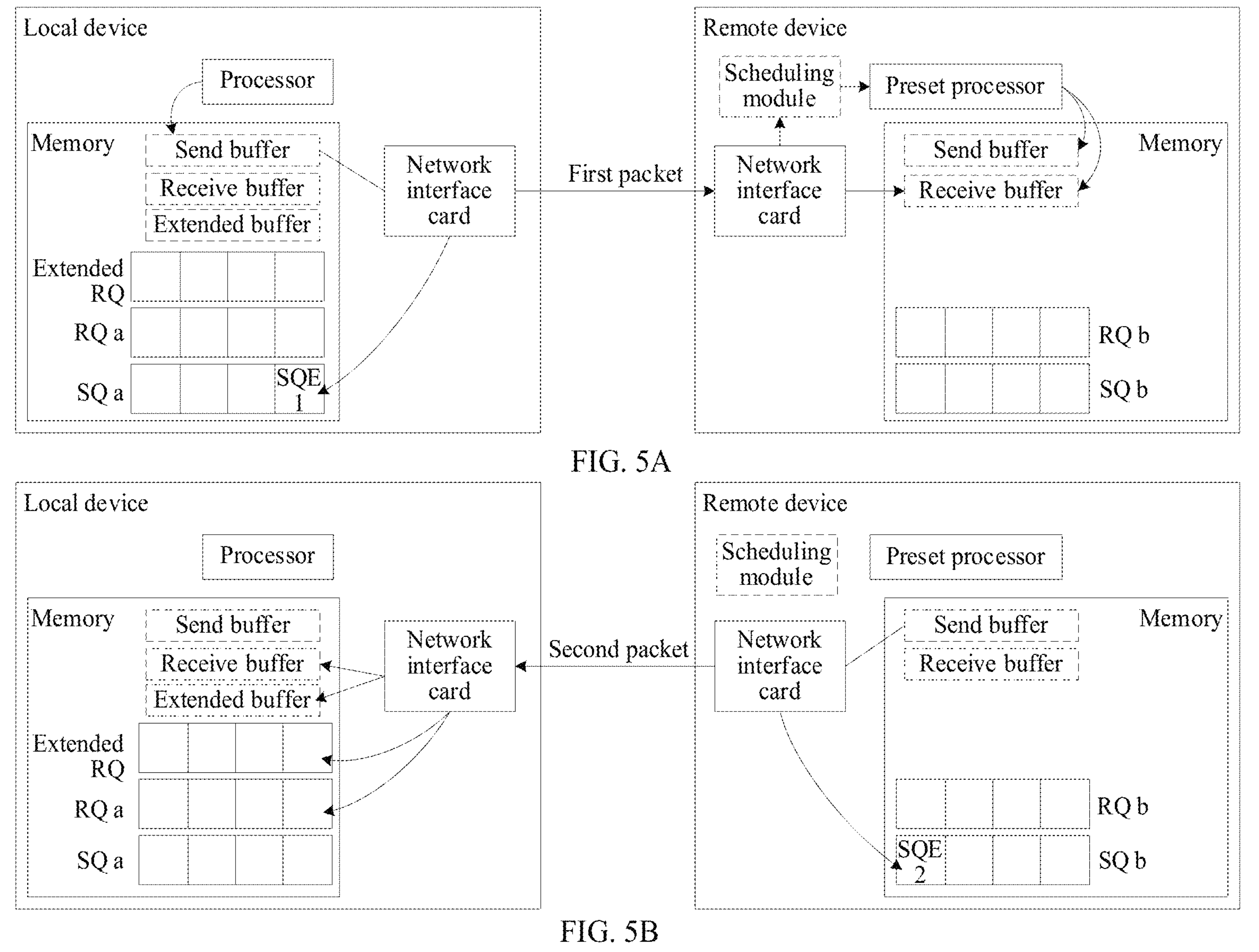
FIG. 5A and FIG. 5B are schematic diagrams of querying memory data of a remote device by a local device according to a method provided in an embodiment of this disclosure.

FIGS. 5A and 5B are schematic diagrams of querying memory data of a remote device by a local device according to the method provided in embodiments of this disclosure. As shown in FIGS. 5A and 5B, the local device and the remote device each have the hardware structure shown in FIG. 2. A QP corresponding to an application process running in the local device includes an SQ a and an RQ a shown in FIGS. 5A and 5B, and the local device is further configured with an extended RQ and an extended buffer corresponding to the extended RQ. A QP connection is established between a QP in the remote device and the QP in the local device, and the QP in the remote device includes an SQ b and an RQ b shown in FIGS. 5A and 5B.

As shown in FIG. 5A, the local device determines a data query request based on a requirement of the local device by using the application process run by a processor, and writes a parameter of the data query request into a send buffer of the local device. Then, a NIC of the local device generates an SQE 1 based on an address of the send buffer, and writes the generated SQE 1 into the SQ a shown in FIGS. 5A and 5B. For a process of generating the SQE 1 by the NIC, refer to related descriptions in S101. Details are not described herein.

When the NIC of the local device sequentially processes SQEs in the SQ a shown in FIGS. 5A and 5B, when processing the SQE 1, the NIC generates, based on the address that is of the send buffer and that is indicated by the SQE 1, a first packet whose operation code is an RMFC operation code, and sends the first packet to the remote device through a network. For specific descriptions of generating the first packet by the NIC of the local device, refer to the foregoing descriptions. Details are not described herein.

Then, a NIC of the remote device receives the first packet. When determining that the first packet is an RMFC-type packet, the NIC writes a data payload of the first packet into a receive buffer of the remote device shown in FIGS. 5A and 5B, and sends, to a scheduling unit, a notification message including an address of the receive buffer and an execution priority of a data query operation corresponding to a function identifier in the data payload of the first packet. The scheduling unit is a scheduling unit configured to schedule a data request for a preset processor (corresponding to the processing unit) that performs the data query operation. Then, the scheduling unit determines an execution sequence of the data query operation based on the execution priority in the received notification message, to schedule the execution sequence of the data query operation. When determining that the data query operation can be performed, the scheduling unit sends an address of a receive buffer corresponding to the execution priority to the preset processor. It should be understood that the address of the receive buffer corresponding to the execution priority is the address of the receive buffer that belongs to the same notification message as the execution priority. In this way, the preset processor reads the data payload in the receive buffer, performs the data query operation based on data request content in the data payload, and writes found target data into a send buffer of the remote device shown in FIGS. 5A and 5B. It may be understood that for a specific process performed by the remote device, refer to the specific procedure performed by the second device in S103. Details are not described herein.

Then, as shown in FIG. 5B, the NIC of the remote device generates an SQE 2 based on an address of the send buffer, and writes the SQE 2 into the SQ b shown in FIGS. 5A and 5B. When the NIC of the remote device sequentially processes SQEs in the SQ b shown in FIGS. 5A and 5B, when processing the SQE 2, the NIC generates, based on the address that is of the send buffer and that is indicated by the SQE 2, a second packet whose operation code is a send operation code, and sends the second packet to the local device through the network. The second packet is a send packet used to carry the target data. For detailed descriptions of generating the SQE 2 by the remote device and generating the send packet used to carry the target data, refer to the descriptions of S21 and S22 and S201. Details are not described herein again.

Then, when receiving the second packet, and determining that a transaction sequence number in a data payload of the second packet is a transaction sequence number in the first packet, the local device determines that the second packet is a response packet of the first packet. In this way, when determining that an operation code of the received second packet is the send operation code, the local device determines whether a length of the target data carried in the second packet is greater than a length of a receive buffer indicated by a head RQE of the RQ a shown in FIGS. 5A and 5B.

When the length of the target data carried in the second packet is less than or equal to the length of the receive buffer indicated by the head RQE of the RQ a shown in FIGS. 5A and 5B, the NIC of the local device writes the target data into the receive buffer indicated by the head RQE of the RQ a, that is, a receive buffer of the local device shown in FIGS. 5A and 5B.

When the length of the target data carried in the second packet is greater than the length of the receive buffer indicated by the head RQE of the RQ a shown in FIGS. 5A and 5B, after filling the receive buffer indicated by the head RQE of the RQ a (that is, a receive buffer of the local device shown in FIGS. 5A and 5B) with the target data, the NIC of the local device further invokes a head extended RQE in the extended RQ of the local device shown in FIGS. 5A and 5B, and writes, into an extended buffer indicated by the head extended RQE, that is, an extended buffer of the local device shown in FIGS. 5A and 5B, data in the target data other than data that has been written into the receive buffer indicated by the head RQE of the RQ a.

In this case, the local device obtains the target data carried in the response packet (namely, the second packet) of the first packet, in other words, obtains the target data obtained after the application process requests to query the memory data of the remote device based on a requirement of the application process.

The foregoing mainly describes the solutions provided in embodiments of this disclosure from a perspective of the method.

Figure 6:
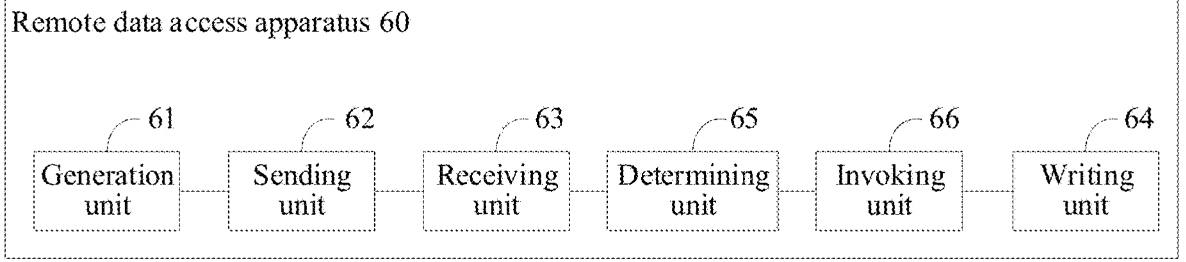
FIG. 6 is a schematic diagram of a structure of a remote data access apparatus according to an embodiment of this disclosure.

To implement the foregoing functions, refer to FIG. 6. FIG. 6 is a schematic diagram of a structure of a remote data access apparatus 60 according to an embodiment of this disclosure. The remote data access apparatus 60 is applied to a first device that is connected to and communicates with a second device. The remote data access apparatus 60 has an RDMA function, and the second device is configured with a NIC having an RDMA function. The remote data access apparatus 60 may be configured to perform the remote data access method, for example configured to perform the method shown in FIG. 3 or FIG. 4A and FIG. 4B. The remote data access apparatus 60 may include a generation unit 61 and a sending unit 62.

The generation unit 61 is configured to generate a first packet including a type identifier and a function identifier. The sending unit 62 is configured to send the first packet to the second device. The type identifier in the first packet indicates that the first packet is an RMFC-type packet, and the RMFC-type packet indicates the second device that receives the first packet to perform a preset operation on local data of the second device. The function identifier in the first packet indicates an operation type of the preset operation.

For example, with reference to FIG. 3, the generation unit 61 may be configured to perform S101, and the sending unit 62 may be configured to perform S102.

Optionally, the operation type of the preset operation includes any one of a query operation, an insert operation, or a delete operation.

Optionally, if the operation type of the preset operation is the query operation, the remote data access apparatus 60 further includes a receiving unit 63 configured to receive a second packet used to carry target data, where the target data is data obtained after the second device performs the query operation on the local data of the second device, and a writing unit 64 configured to write the target data into a receive buffer, where the receive buffer is a buffer indicated by a head RQE of an RQ corresponding to an application process running in the first device.

For example, with reference to FIG. 4A and FIG. 4B, the receiving unit 63 and the writing unit 64 may be configured to perform S203.

Optionally, the first device is provided with an extended RQ including at least one extended RQE, and any extended RQE in the at least one extended RQE includes an address of an extended buffer corresponding to the any extended RQE. The remote data access apparatus 60 further includes a determining unit 65 configured to determine that a length of the target data is greater than a length of the receive buffer, and an invoking unit 66 configured to invoke one or more extended RQEs. The writing unit 64 is further configured to write the target data into the receive buffer and an extended buffer corresponding to the one or more extended RQEs.

For example, with reference to FIG. 4A and FIG. 4B, the determining unit 65, the invoking unit 66, and the writing unit 64 may be configured to perform S204.

Optionally, the writing unit 64 is further configured to write a CQE into a CQ. When a NIC of the first device invokes the one or more extended RQEs, the CQE indicates that the target data has been written into the receive buffer and the extended buffer corresponding to the one or more extended RQEs, and indicates addresses of the receive buffer and the extended buffer corresponding to the one or more extended RQEs.

For example, with reference to FIG. 4A and FIG. 4B, the writing unit 64 may be configured to perform S205.

Optionally, the function identifier in the first packet is determined based on a data request sent by the application process running in the first device.

Optionally, the generation unit 61 is further configured to generate the first packet based on a head SQE of an SQ corresponding to the application process running in the first device. Herein, the head SQE includes an address of a send buffer corresponding to the head SQE, and the send buffer is used to store a parameter of the data request sent by the application process.

For example, with reference to FIG. 3, the generation unit 61 may be configured to perform S101.

For specific descriptions of the foregoing optional manners, refer to the foregoing method embodiments. Details are not described herein again. In addition, for explanations of any remote data access apparatus 60 provided above and descriptions of beneficial effects, refer to the corresponding method embodiments. Details are not described again.

For example, with reference to FIG. 2, the remote data access apparatus 60 may be the network interface 113 of the host device 11 shown in FIG. 2. In the remote data access apparatus 60, functions implemented by the generation unit 61, the determining unit 65, and the invoking unit 66 may be implemented by a processing module of the network interface 113 shown in FIG. 2, and functions implemented by the sending unit 62 and the receiving unit 63 may be implemented by a transmission interface of the network interface 113 shown in FIG. 2.

Figure 7:
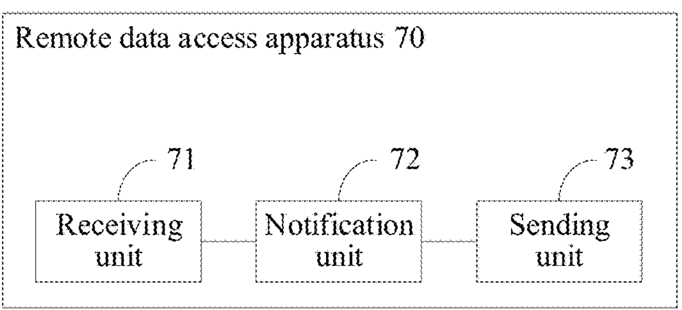
FIG. 7 is a schematic diagram of a structure of another remote data access apparatus according to an embodiment of this disclosure.

FIG. 7 is a schematic diagram of a structure of another remote data access apparatus 70 according to an embodiment of this disclosure. The remote data access apparatus 70 is applied to a second device that is connected to and communicates with a first device. The remote data access apparatus 70 has an RDMA function, and the first device is configured with a NIC having an RDMA function. The remote data access apparatus 70 may be configured to perform the remote data access method, for example configured to perform the method shown in FIG. 3 or FIG. 4A and FIG. 4B. The remote data access apparatus 70 may include a receiving unit 71 and a notification unit 72.

The receiving unit 71 is configured to receive a first packet from the first device, where the first packet includes a type identifier and a function identifier. The notification unit 72 is configured to, when it is determined that the type identifier in the first packet is an identifier indicating that the first packet is an RMFC-type packet, notify a processing unit of the second device to perform a preset operation on local data of the second device, where an operation type of the preset operation is an operation type indicated by the function identifier in the first packet.

For example, with reference to FIG. 3, the receiving unit 71 and the notification unit 72 may be configured to perform S103.

Optionally, the remote data access apparatus 70 further includes a sending unit 73 configured to send a notification message to the processing unit, where the notification message includes an execution priority of the preset operation, and the notification message notifies the processing unit to perform the preset operation on the local data of the second device based on the execution priority of the preset operation.

Optionally, the remote data access apparatus 70 further includes a sending unit 73 configured to send a notification message to a scheduling unit of the second device, where the scheduling unit is configured to schedule an execution sequence of a task in the processing unit of the second device, the notification message includes an execution priority of the preset operation, and the notification message notifies the scheduling unit to schedule an execution sequence of the preset operation for the processing unit based on the execution priority of the preset operation, so that the processing unit performs the preset operation on the local data of the second device based on the execution sequence.

Optionally, the operation type of the preset operation includes any one of a query operation, an insert operation, or a delete operation.

Optionally, if the operation type of the preset operation is the query operation, the remote data access apparatus 70 further includes the sending unit 73 configured to send, to the first device, a second packet used to carry target data, where the target data is data obtained after the second device performs the query operation on the local data of the second device.

For example, with reference to FIG. 4A and FIG. 4B, the sending unit 73 may be configured to perform S202.

Optionally, the function identifier in the first packet is determined by the first device based on a data request sent by an application process running in the first device.

For specific descriptions of the foregoing optional manners, refer to the foregoing method embodiments. Details are not described herein again. In addition, for explanations of any remote data access apparatus 70 provided above and descriptions of beneficial effects, refer to the corresponding method embodiments. Details are not described again.

For example, with reference to FIG. 2, the remote data access apparatus 70 may be the network interface 113 of the host device 11 shown in FIG. 2. In the remote data access apparatus 70, functions implemented by the receiving unit 71 and the sending unit 73 may be implemented by a transmission interface of the network interface 113 shown in FIG. 2.

A person skilled in the art should easily be aware that, in combination with units and algorithm steps of the examples described in the embodiments disclosed in this specification, this disclosure can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

It should be noted that, division into the modules in FIG. 6 and FIG. 7 is an example and is merely logical function division, and may be other division during actual implementation. For example, two or more functions may be integrated into one processing module. The integrated module may be implemented in a form of hardware, or may be implemented in a form of a software functional module.

An embodiment of this disclosure further provides a remote data access system. The system includes a first device and a second device. The first device is connected to and communicates with the second device, and the first device and the second device each are configured with a NIC supporting an extended RDMA protocol in embodiments of this disclosure. A NIC of the first device and a NIC of the second device are separately configured to perform method steps separately performed in FIG. 3 or FIG. 4A and FIG. 4B. Details are not described again.

An embodiment of this disclosure further provides a computer program product, and a computer-readable storage medium configured to store the computer program product. The computer program product may include one or more program instructions. When the one or more program instructions are run by one or more processors, all or some functions described in FIG. 3 or FIG. 4A and FIG. 4B may be provided. Therefore, for example, one or more features of S101 to S103 in FIG. 3 may be undertaken by one or more instructions in the computer program product.

In some examples, the remote data access apparatus 60 or the remote data access apparatus 70 described for FIG. 3 or FIG. 4A and FIG. 4B may be configured to provide various operations, functions, or actions in response to one or more program instructions stored in a computer-readable storage medium.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer-executable instructions are executed on a computer, some or all of the procedures or functions according to embodiments of this disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device integrating one or more usable media, for example, a server or a data center. The usable medium may be a magnetic medium (for example, a floppy disk, a hard disk, or a magnetic tape), an optical medium (for example, a DIGITAL VERSATILE DISC (DVD)), a semiconductor medium (for example, a solid-state disk (SSD)), or the like.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method implemented by a network interface card (NIC) of a first device, wherein the method comprises:

generating a first packet, wherein the first packet comprises a type identifier and a function identifier, wherein the type identifier indicates that the first packet is a remote memory function call (RMFC)-type packet instructing a second device to perform a preset operation from a plurality of allowed operations on local data of the second device, wherein the type identifier configures a second NIC of the second device to notify a processor of the second device to perform the preset operation, and wherein the function identifier indicates which operation type from the allowed operations to perform for the preset operation; and sending the first packet to the second device.

2. The method of claim 1, wherein the operation type comprises one of a query operation, an insert operation, or a delete operation.

3. The method of claim 2, wherein when the operation type is the query operation, the method further comprises:

receiving a second packet carrying target data; and writing the target data into a receive buffer, wherein the receive buffer is indicated by a head receive queue element (RQE) of a receive queue (RQ) corresponding to an application process running in the first device.

4. The method of claim 3, further comprising:

invoking one or more extended RQEs when a first length of the target data is longer than a second length of the receive buffer; and writing the target data into the receive buffer and an extended buffer corresponding to the one or more extended RQEs.

5. The method of claim 4, further comprising writing a completion queue element (CQE) into a completion queue (CQ), wherein when the NIC invokes the one or more extended RQEs, the CQE indicates that the target data has been written into the receive buffer and the extended buffer and further indicates addresses of the receive buffer and the extended buffer.

6. The method of claim 1, wherein the function identifier is based on a data request of an application process running in the first device.

7. The method of claim 1, wherein generating the first packet comprises generating the first packet based on a head send queue element (SQE) of a send queue (SQ) corresponding to an application process running in the first device, wherein the head SQE comprises an address of a send buffer corresponding to the head SQE, and wherein the send buffer stores a parameter of a data request of the application process.

8. A method implemented by a network interface card (NIC) of a second device, wherein the method comprises:

receiving a first packet from a first device, wherein the first packet comprises a type identifier and a function identifier; and notifying, in response to the type identifier, a processor of the second device to perform a preset operation from a plurality of allowed operations on local data of the second device when the type identifier indicates that the first packet is a remote memory function call (RMFC)-type packet, wherein the function identifier indicates which operation type from the allowed operations to perform for the preset operation.

9. The method of claim 8, further comprising sending a notification message to the processor, wherein the notification message comprises an execution priority of the preset operation, and wherein the notification message notifies the processor to perform the preset operation on the local data based on the execution priority.

10. The method of claim 8, further comprising sending a notification message to a scheduling system of the second device, wherein the notification message comprises an execution priority of the preset operation, and wherein the notification message notifies the scheduling system to schedule an execution sequence of the preset operation for the processor based on the execution priority to enable the processor to perform the preset operation on the local data based on the execution sequence.

11. The method of claim 8, wherein the operation type comprises one of a query operation, an insert operation, or a delete operation.

12. The method of claim 11, wherein when the operation type is the query operation, the method further comprises:

performing the query operation on the local data to obtain target data; and sending a second packet to the first device, wherein the second packet carries the target data.

13. The method of claim 8, wherein the function identifier is based on a data request of an application process running in the first device.

14. A network interface card (NIC) having a remote direct memory access (RDMA) function and configured in a first device, wherein the NIC comprises:

a transmission interface; and one or more processors coupled to the transmission interface and configured to:

generate a first packet, wherein the first packet comprises a type identifier and a function identifier, wherein the type identifier indicates that the first packet is a remote memory function call (RMFC)-type packet instructing a second device to perform a preset operation from a plurality of allowed operations on local data of the second device, wherein the type identifier configures a second NIC of the second device to notify a processor of the second device to perform the preset operation, and wherein the function identifier indicates which operation type from the allowed operations to perform for the preset operation; and send, using the transmission interface, the first packet to the second device.

15. The NIC of claim 14, wherein the operation type comprises one of a query operation, an insert operation, or a delete operation.

16. The NIC of claim 15, wherein the one or more processors are further configured to:

receive, using the transmission interface, a second packet carrying target data; and write the target data into a receive buffer, wherein the receive buffer is indicated by a head receive queue element (RQE) of a receive queue (RQ) corresponding to an application process running in the first device.

17. The NIC of claim 16, wherein the one or more processors are further configured to:

invoke one or more extended RQEs when a first length of the target data is longer than a second length of the receive buffer; and write the target data into the receive buffer and an extended buffer corresponding to the one or more extended RQEs.

18. The NIC of claim 17, wherein the one or more processors are further configured to write a completion queue element (CQE) into a completion queue (CQ), and wherein when the NIC invokes the one or more extended RQEs, the CQE indicates that the target data has been written into the receive buffer and the extended buffer and further indicates addresses of the receive buffer and the extended buffer.

19. The NIC of claim 14, wherein the function identifier is based on a data request of an application process running in the first device.

20. The NIC of claim 14, wherein the one or more processors are further configured to generate the first packet based on a head send queue element (SQE) of a send queue (SQ) corresponding to an application process running in the first device, wherein the head SQE comprises an address of a send buffer corresponding to the head SQE, and wherein the send buffer stores a parameter of a data request of the application process.

* * * * *